US012123414B2

(12) United States Patent
Park et al.

(10) Patent No.: US 12,123,414 B2
(45) Date of Patent: Oct. 22, 2024

(54) ROTARY COMPRESSOR

(71) Applicant: LG ELECTRONICS INC., Seoul (KR)

(72) Inventors: Joonhong Park, Seoul (KR); Seseok Seol, Seoul (KR); Seoungmin Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/283,057

(22) PCT Filed: Mar. 18, 2022

(86) PCT No.: PCT/KR2022/003801
§ 371 (c)(1),
(2) Date: Sep. 20, 2023

(87) PCT Pub. No.: WO2022/211331
PCT Pub. Date: Oct. 6, 2022

(65) Prior Publication Data

US 2024/0167476 A1 May 23, 2024

(30) Foreign Application Priority Data

Mar. 30, 2021 (KR) ........................ 10-2021-0041370

(51) Int. Cl.
*F04C 18/356* (2006.01)
*F01C 21/08* (2006.01)
(Continued)

(52) U.S. Cl.
CPC ........ *F04C 29/028* (2013.01); *F01C 21/0863* (2013.01); *F04C 18/356* (2013.01);
(Continued)

(58) Field of Classification Search
CPC .............. F01C 21/0845; F01C 21/0881; F01C 21/0863; F04C 18/356; F04C 18/3564;
(Continued)

(56) References Cited

U.S. PATENT DOCUMENTS 3,102,494 A * 9/1963 Adams ................ F01C 21/0863 418/268

FOREIGN PATENT DOCUMENTS

CN 2528971 1/2003
CN 201344128 Y * 11/2009
(Continued)

OTHER PUBLICATIONS

English translation of CN 201344128 by PE2E Sep. 5, 2024.*
International Search Report dated Jul. 13, 2022 issued in Application No. PCT/KR2022/003801.
(Continued)

*Primary Examiner* — Deming Wan
(74) *Attorney, Agent, or Firm* — KED & ASSOCIATES, LLP

(57) ABSTRACT

A rotary compressor is provided that may include at least one vane that is slidably inserted into at least one vane slot provided in a roller or a cylinder so as to separate a compression space into a plurality of compression chambers. The at least one vane has an at least one oil supply groove formed in at least one of axial side surfaces, respectively, facing a main bearing and a sub bearing. The at least one oil supply groove may be longer in a longitudinal direction of the at least one vane than in a widthwise direction of the at least one vane. With this structure, it is possible to suppress friction loss and wear on a friction surface by supplying oil to the friction surface in contact with the at least one vane.

16 Claims, 13 Drawing Sheets

(51) Int. Cl.

| | |
|---|---|
| ***F04C 29/02*** | (2006.01) |
| ***F25B 31/00*** | (2006.01) |
| ***F25B 31/02*** | (2006.01) |

(52) U.S. Cl.
CPC .......... *F04C 29/025* (2013.01); *F25B 31/002* (2013.01); *F25B 31/026* (2013.01); *F04C 2240/50* (2013.01); *F04C 2240/603* (2013.01); *F05B 2210/14* (2013.01)

(58) Field of Classification Search
CPC .... F04C 29/028; F04C 29/025; F25B 31/002; F25B 31/0265
See application file for complete search history.

(56) References Cited

FOREIGN PATENT DOCUMENTS

| | | |
|---|---|---|
| JP | 10-169583 | 6/1998 |
| JP | 11-037072 | 2/1999 |
| JP | 2006-077597 | 3/2006 |
| JP | 2013-213438 | 10/2013 |
| JP | 2017-066889 | 4/2017 |

OTHER PUBLICATIONS

Korean Office Action dated Apr. 7, 2022 issued in Application No. 10-2021-0041370.

Korean Notice of Allowance dated Feb. 23, 2023 issued in Application No. 10-2021-0041370.

* cited by examiner

ROTARY COMPRESSOR

CROSS-REFERENCE TO RELATED PATENT APPLICATIONS

This application is a U.S. National Stage Application under 35 U.S.C. § 371 of PCT Application No. PCT/KR2022/003801, filed Mar. 18, 2022, which claims priority to Korean Patent Application No. 10-2021-0041370, filed Mar. 30, 2021, whose entire disclosures are hereby incorporated by reference.

TECHNICAL FIELD

A rotary compressor is disclosed herein.

BACKGROUND ART

Rotary compressors may be classified into a type in which a vane is slidably inserted into a cylinder to be brought into contact with a roller, and another type in which a vane is slidably inserted into a roller to be brought into contact with a cylinder. In general, the former is called a roller eccentric rotary compressor (hereinafter, referred to as a "rotary compressor"), and the latter is referred to as a vane concentric rotary compressor (hereinafter, referred to as a "vane rotary compressor").

As for a rotary compressor, a vane inserted in a cylinder is drawn out toward a roller by elastic force or back pressure to come into contact with an outer circumferential surface of the roller. On the other hand, as for a vane rotary compressor, a vane inserted in a roller rotates together with the roller, and is drawn out by centrifugal force and back pressure to come into contact with an inner circumferential surface of a cylinder.

A rotary compressor independently forms compression chambers as many as the number of vanes per revolution of a roller, and the compression chambers simultaneously perform suction, compression, and discharge strokes. On the other hand, a vane rotary compressor continuously forms as many compression chambers as the number of vanes per revolution of a roller, and the compression chambers sequentially perform suction, compression, and discharge strokes. Accordingly, the vane rotary compressor has a higher compression ratio than the rotary compressor. Therefore, the vane rotary compressor is more suitable for high-pressure refrigerant, such as R32, R410a, and $CO_2$, for example, which has a low ozone depletion potential (ODP) and a low global warming index (GWP).

Such a vane rotary compressor is disclosed in Patent Document 1 (Japanese Laid-Open Patent Application No. JP2013-213438A). The vane rotary compressor disclosed in Patent Document 1 has a structure in which suction refrigerant is filled in an inner space of a motor room as in a low-pressure type but a plurality of vanes are slidably inserted into a rotating roller.

In Patent Document 1, a back pressure chamber is disposed in a rear end portion of each vane to communicate with a back pressure pocket. The back pressure pocket is divided into a first pocket forming an intermediate pressure and a second pocket forming a discharge pressure or an intermediate pressure close to the discharge pressure. The first pocket communicates with the back pressure chamber located at an upstream side and the second pocket communicates with the back pressure chamber located at a downstream side, with respect to a direction from a suction side to a discharge side.

However, in the vane rotary compressor in the related art as described above, while a vane rotates together with a roller during operation, both axial side surfaces of the vane slide with respect to a main bearing and a sub bearing facing the vane. At this time, friction loss or wear may occur between both axial side surfaces of the vane or the main bearing or the sub bearing facing the vane.

Further, in the vane rotary compressor in the related art, as the vane slides in a vane slot of the roller during operation, friction loss or wear may occur between the vane and the roller. In particular, as a front end side of the vane drawn out of the roller is subjected to a gas force in a counter-rotational direction due to a pressure difference between both compression chambers, a rear end side of the vane on a side opposite thereto, may be tilted in a rotational direction, thereby causing excessive friction with the vane slot.

In addition, the above-described problem may occur more significantly in the case of high-pressure refrigerant, such as R32, R410a, and $CO_2$, for example, which is used in compressors for air conditioners. That is, when the high-pressure refrigerant is used, a same level of cooling capability may be obtained as that obtained when using relatively low-pressure refrigerant such as R134a, even though a volume of each compression chamber is reduced by increasing the number of vanes. However, as the number of vanes increases, a friction area between the vane and the main bearing or the sub bearing facing the vane and between the vane and the roller increases accordingly.

Further, when high-pressure refrigerant is used, a distance between the axial side surface of the vane and the main bearing or the sub bearing facing the vane must be managed to be smaller in consideration of leakage between the compression chambers, thereby further increasing friction loss between the vane and the main bearing or the sub bearing. In addition, in the case of high-pressure refrigerant, as a pressure difference between the compression chambers further increases, friction loss or wear between the vane and the roller may also increase.

DISCLOSURE OF INVENTION

Technical Problem

Embodiments disclosed herein provide a rotary compressor capable of reducing friction loss and wear between an axial side surface of a vane and a main bearing or sub bearing facing the vane.

Further, embodiments disclosed herein provide a rotary compressor capable of sufficiently supplying oil between an axial side surface of a vane and a main bearing or sub bearing facing the vane, thereby reducing friction loss and wear therebetween.

Moreover, embodiments disclosed herein provide a rotary compressor capable of allowing a predetermined amount of oil to be stored between an axial side surface of a vane and a main bearing or sub bearing facing the vane, thereby rapidly supplying oil between the axial side of the vane and the main bearing or the sub bearing facing the vane during restart.

Embodiments disclosed herein provide a rotary compressor capable of reducing friction loss and wear between a vane and a vane slot facing the vane.

Further, embodiments disclosed herein provide a rotary compressor capable of reducing a frictional area between a vane and a vane slot facing the vane, thereby suppressing friction loss and wear therebetween.

Moreover, embodiments disclosed herein provide a rotary compressor capable of reducing friction loss between a rear edge of a vane and a vane slot facing the vane.

In addition, embodiments disclosed herein provide a rotary compressor capable of suppressing friction loss and wear between a vane and a main bearing or sub bearing and between the vane and a vane slot even when high-pressure refrigerant, such as R32, R410a, and $CO_2$, for example, is used.

Solution to Problem

Embodiments disclosed herein provide a rotary compressor including a casing, a cylinder, a main bearing and a sub bearing, a rotary shaft, a roller, and at least one vane. The casing may have a sealed inner space. The cylinder may be provided inside of the casing to form a compression space. The main bearing and the sub bearing may be provided on both axial sides of the cylinder, respectively, to support the rotary shaft. The rotary shaft may be supported by passing through the main bearing hole and the sub bearing hole. The roller may be provided on the rotary shaft to be eccentrically provided in the compression space. The vane may be slidably inserted into a vane slot provided in the roller or the cylinder to divide the compression space into a plurality of compression chambers. The vane may be provided with an oil supply groove disposed on at least one of both axial side surfaces facing the main bearing and the sub bearing. The oil supply groove may be configured to have a larger length in a lengthwise direction than in a widthwise direction of the vane. With this structure, oil may be supplied to a friction surface in contact with the vane to suppress friction loss and wear on the friction surface.

The oil supply groove may extend in a lengthwise direction from an edge of a vane rear end surface accommodated in the vane slot toward a vane front end surface on a side opposite thereto. With this structure, oil may be supplied far along a lengthwise direction of the vane to secure a wide lubrication area, thereby suppressing friction loss and wear on a friction surface thereof.

The oil supply groove may be spaced apart by a preset or predetermined distance from a first edge of a vane rear end surface accommodated in the vane slot to extend in a lengthwise direction toward a vane front end surface on a side opposite thereto. With this structure, oil may be preserved on a friction surface of the vane so as to be quickly lubricated when the compressor is restarted.

Sealing portions may be disposed on both widthwise sides of the oil supply groove, respectively, and both the sealing portions may be disposed to be larger than or equal to a width of the oil supply groove. With this structure, leakage between compression chambers may be suppressed while lubricating a friction surface of the vane.

The oil supply grooves may be disposed on both axial side surfaces of the vane, and the oil supply grooves disposed on the both axial side surfaces may be disposed to be symmetrical to each other. With this structure, both axial side surfaces of the vane may be easily machined and effectively lubricated.

The oil supply grooves may be disposed on both axial side surfaces of the vane, respectively, and the oil supply grooves disposed on both the axial side surfaces may be disposed to be asymmetrical to each other. With this structure, oil may be additionally supplied to a surface requiring relatively more lubrication so as to increase the lubrication effect.

A discharge port may be disposed on either one side of the main bearing and the sub bearing. As for the oil supply groove, a length of the oil supply groove facing the bearing on the side where the discharge hole is not disposed may be configured to have a larger length than that facing the bearing on the side where the discharge hole is disposed. With this structure, an amount of oil supply to a friction surface of the vane may be increased so as to increase the lubrication effect.

The oil supply groove may include a first oil supply groove on a side of a vane rear end surface accommodated in the vane slot, and a second oil supply groove extending from the first oil supply groove toward a vane front end surface opposite to the vane rear end surface. A volume of the first oil supply groove may be disposed to have a larger than that of the second oil supply groove. With this structure, oil may be efficiently introduced into the oil supply groove while at the same time preserving a predetermined amount of oil in the oil supply groove.

The first oil supply groove may extend from a first edge of the vane rear end surface to communicate with the vane rear end surface. With this structure, oil may be efficiently introduced into the oil supply groove so as to increase the lubrication effect.

The first oil supply groove may be spaced apart by a preset or predetermined distance from a first edge of the vane rear end surface so as to be separated from the vane rear end surface. With this structure, oil may be preserved in the oil supply groove to quickly supply oil to the friction surface during restart.

The oil supply groove may be disposed on at least either one of both circumferential side surfaces of the vane to extend from a second edge of a vane rear end surface so as to communicate with the vane rear end surface accommodated in the vane slot. With this structure, friction loss and wear between the vane and the vane slot may be suppressed.

Support portions provided on both axial sides of the oil supply groove, respectively, to be in contact with an inner surface of the vane slot may be disposed at the second edge. The support portions may extend from the vane rear end surface so as to protrude beyond the oil supply groove. With this structure, lubrication may be made between the vane and the vane slot while the behavior of the vane is stabilized.

The oil supply groove may be disposed as a plurality at preset or predetermined intervals along an axial direction at the second edge of the vane rear end surface. With this structure, oil may be uniformly supplied in a heightwise direction of the vane while the behavior of the vane is further stabilized.

The oil supply groove disposed on a rotational side of the roller may be disposed to be deeper than that on a side opposite thereto in a widthwise direction of the vane. With this structure, even when the vane receives a gas reaction force, friction loss and wear between an inner end of the vane and the vane slot may be suppressed.

A vane front end surface may be disposed to be inclined toward a rotational direction of the roller than a vane rear end surface on a side opposite thereto, accommodated in the vane slot. The oil supply grooves may be disposed on both circumferential side surfaces of the vane, respectively. Of the oil supply grooves, the oil supply groove on a rotational side of the vane may be disposed to have a larger length toward the vane front end surface on a side opposite to the vane rear end surface than that on a side opposite thereto. With this structure, it may be possible to secure rigidity of the vane while reducing friction loss and wear between the vane and the vane slot.

Embodiments disclosed herein provide a rotary compressor including a casing, a cylinder, a main bearing and a sub bearing, a rotary shaft, a roller, and at least one vane. The casing may have a sealed inner space. The cylinder may be provided inside of the casing to form a compression space. The main bearing and the sub bearing may be provided on both axial sides of the cylinder, respectively, to support the rotary shaft. The rotary shaft may be supported by passing through the main bearing hole and the sub bearing hole. The roller may be provided on the rotary shaft to be eccentrically provided in the compression space. The vane may be slidably inserted into a vane slot provided in the roller or the cylinder to divide the compression space into a plurality of compression chambers. The vane may be provided with an oil supply groove on at least either one of both circumferential side surfaces thereof. The oil supply groove may extend from a second edge of a vane rear end surface to communicate with the vane rear end surface accommodated in the vane slot. With this structure, friction loss and wear between the vane and the vane slot may be suppressed.

Support portions provided on both axial sides of the oil supply groove, respectively, to be in contact with an inner surface of the vane slot may be disposed at the second edge. The support portions may extend from the vane rear end surface so as to protrude beyond the oil supply groove. With this structure, lubrication may be made between the vane and the vane slot while the behavior of the vane is stabilized.

The oil supply groove may be disposed as a plurality at preset or predetermined intervals along an axial direction at the second edge of the vane rear end surface. With this structure, oil may be uniformly supplied in a heightwise direction of the vane while the behavior of the vane is further stabilized.

The oil supply groove disposed on a rotational side of the roller may be disposed to be deeper than that on a side opposite thereto in a widthwise direction of the vane. With this structure, it may be possible to secure rigidity of the vane while reducing friction loss and wear between the vane and the vane slot.

As for the vane, a vane front end surface may be inclined toward a rotational side of the roller than a vane rear end surface on a side opposite thereto, accommodated in the vane slot. The oil supply grooves may be disposed on both circumferential side surfaces of the vane, respectively. The oil supply groove on a rotational side of the vane may be disposed to have a larger length toward the vane front end surface than that on a side opposite thereto. With this structure, it may be possible to secure rigidity of the vane while reducing friction loss and wear between the vane and the vane slot.

At least one or more vane slots may be disposed on the roller along an outer circumferential surface of the roller, and at least one or more back pressure chambers communicating with the vane slots, respectively, may be disposed to pass through an axial direction inside the roller. A back pressure pocket communicating with the back pressure chamber may be disposed on at least one side of the main bearing and the sub bearing. At least a part or portion of the oil supply groove may overlap the back pressure pocket in an axial direction. With this structure, oil may be quickly supplied to the oil supply groove so as to increase a lubrication effect on a friction surface of the vane.

Advantageous Effects of Invention

In a rotary compressor according to embodiments disclosed herein, an oil supply groove may be disposed to have a larger length in a lengthwise direction than a widthwise direction of the vane on at least one side of both axial side surfaces of the vane facing the main bearing and the sub bearing. With this structure, oil may be supplied to a friction surface in contact with the vane to suppress friction loss and wear on the friction surface.

In the rotary compressor according to embodiments disclosed herein, an oil supply groove extending in a lengthwise direction from an edge of a vane rear end surface accommodated in a vane slot toward a vane front end surface on a side opposite thereto, may be disposed. With this structure, oil may be supplied far along a lengthwise direction of the vane to secure a wide lubrication area, thereby suppressing friction loss and wear on a friction surface thereof.

In the rotary compressor according to embodiments disclosed herein, an oil supply groove spaced apart by a preset or predetermined distance from a first edge of a vane rear end surface accommodated in a vane slot to extend in a lengthwise direction toward a vane front end surface on a side opposite thereto, may be disposed. With this structure, oil may be preserved on a friction surface of the vane so as to be quickly lubricated when the compressor is restarted.

In the rotary compressor according to embodiments disclosed herein, sealing portions may be disposed on both widthwise sides of the oil supply groove, respectively, and both the sealing portions may be disposed to be larger than or equal to a width of the oil supply groove. With this structure, leakage between compression chambers may be suppressed while lubricating a friction surface of the vane.

In the rotary compressor according to embodiments disclosed herein, oil supply grooves may be disposed to be symmetrical or asymmetrical to each other on both axial side surfaces of the vane. With this structure, both axial side surfaces of the vane may be easily machined and effectively lubricated, or oil may be additionally supplied to a surface requiring more lubrication, thereby increasing a lubrication effect.

In the rotary compressor according to embodiments disclosed herein, a first oil supply groove may be disposed on a side of a vane rear end surface accommodated in a vane slot, and a second oil supply groove may be disposed to extend from the first oil supply groove toward a vane front end surface on a side opposite to the vane rear end surface, and to be narrower than the first oil supply groove. With this structure, oil may be efficiently introduced into the oil supply groove while at the same time preserving a predetermined amount of oil in the oil supply groove.

In the rotary compressor according to embodiments disclosed herein, an oil supply groove may be disposed on at least either one of both circumferential side surfaces of the vane, and the oil supply groove may extend from a second edge of a vane rear end surface to communicate with the vane rear end surface accommodated in the vane slot. With this structure, friction loss and wear between the vane and the vane slot may be suppressed.

In the rotary compressor according to embodiments disclosed herein, support portions protruding from both axial sides of the oil supply groove, respectively, may be disposed to be in contact with an inner surface of the vane slot. With this structure, lubrication may be made between the vane and the vane slot while the behavior of the vane is stabilized.

In the rotary compressor according to embodiments disclosed herein, a plurality of oil supply grooves may be disposed at preset or predetermined intervals along an axial direction at the second edge of the vane rear end surface. With this structure, oil may be uniformly supplied in a heightwise direction of the vane while the behavior of the vane is further stabilized.

In the rotary compressor according to embodiments disclosed herein, an oil supply groove disposed on a rotational side of roller may be disposed to be deeper than an oil supply groove on a side opposite thereto in a widthwise direction of the vane. With this structure, even when the vane receives a gas reaction force, friction loss and wear between an inner end of the vane and the vane slot may be suppressed.

In the rotary compressor according to embodiments disclosed herein, an oil supply groove may be disposed on a friction surface of the vane even when high-pressure refrigerant, such as R32, R410a, and $CO_2$, for example, is used. With this structure, friction loss and wear between the vane and the main bearing or sub bearing and between the vane and the vane slot may be suppressed.

MODE FOR THE INVENTION

Hereinafter, a rotary compressor according to embodiments disclosed herein will be described with reference to an embodiment illustrated in the accompanying drawings. For reference, an oil supply hole according to the embodiments disclosed herein may be equally applied to a vane rotary compressor in which a vane is slidably inserted into the roller. For example, the embodiments may be applied not only to an example in which the vane slot is inclined but also to an example in which the vane slot is disposed radially. Hereinafter, an example in which a vane slot is inclined relative to a roller and an inner circumferential surface of a cylinder has an asymmetric elliptical shape will be described as a representative example.

Figure 1:
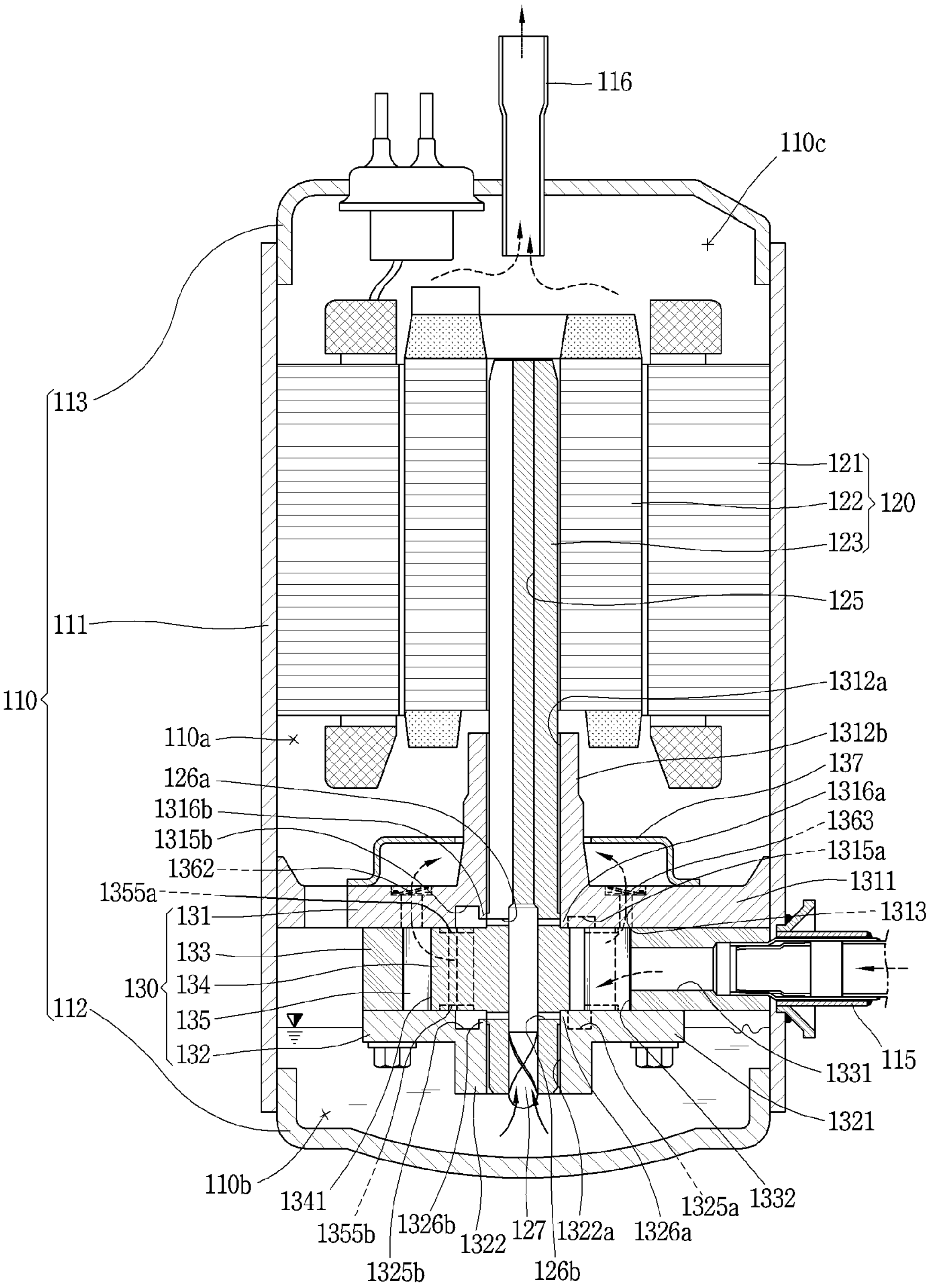
FIG. 1 is a cross-sectional view of a vane rotary compressor according to an embodiment.
Figure 2:
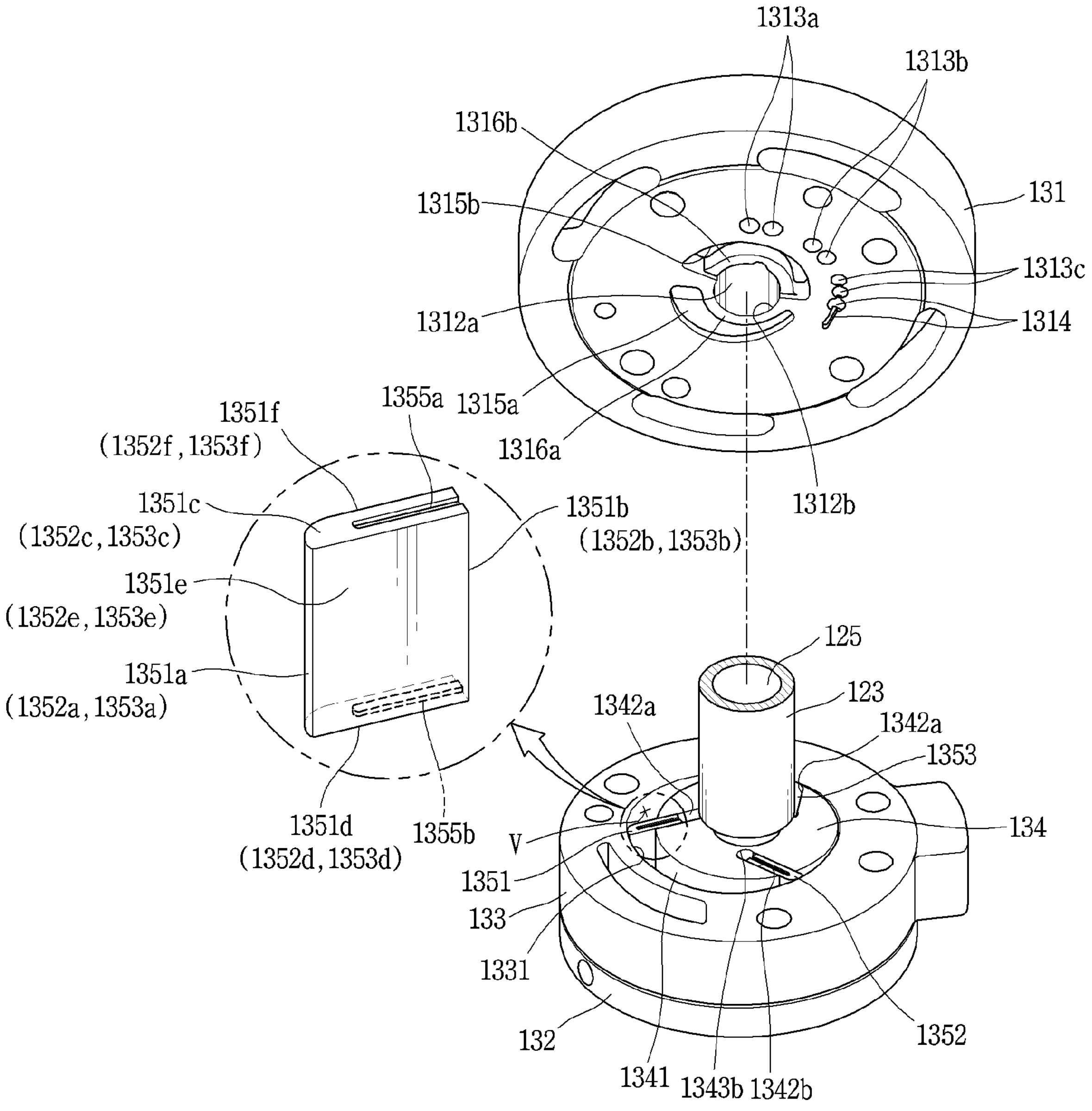
FIG. 2 is an exploded perspective view of a compression unit in FIG. 1.
Figure 3:
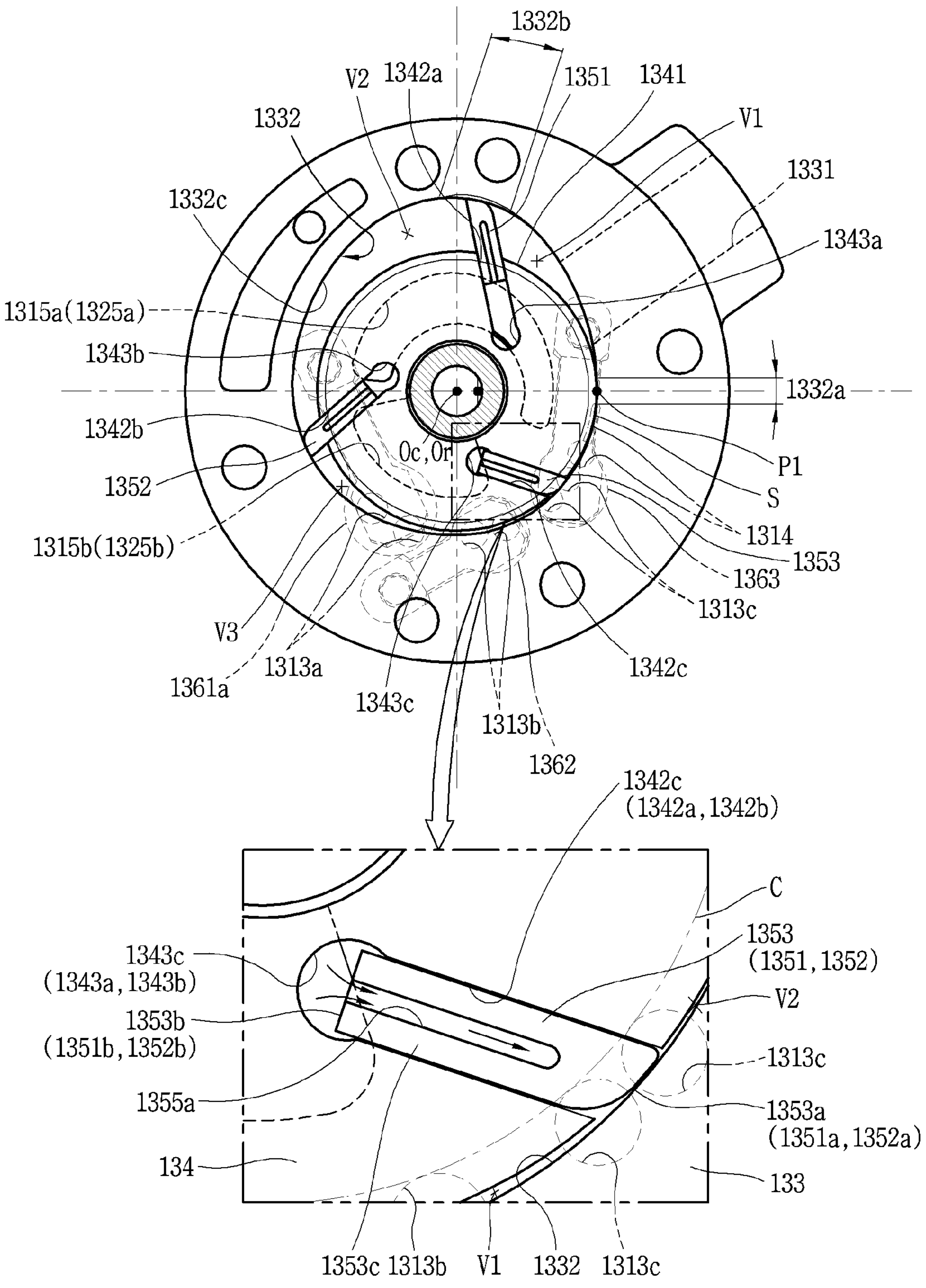
FIG. 3 is an assembled plan view showing the compression unit of FIG. 2.

FIG. 1 is a cross-sectional view of a vane rotary compressor according to an embodiment. FIG. 2 is an exploded perspective view showing a compression unit in FIG. 1, and FIG. 3 is an assembled plan view showing the compression unit of FIG. 2.

Referring to FIG. 1, a vane rotary compressor according to an embodiment includes a casing 110, a driving (or drive) motor 120, and a compression unit 130. The drive motor 120 is installed in an upper inner space 110*a* of the casing 110, and the compression unit 130 is installed in a lower inner space 110*a* of the casing 110. The drive motor 120 and the compression unit 130 are connected through a rotary shaft 123.

The casing 110 that defines an outer appearance of the compressor may be classified as a vertical type and a horizontal type according to a compressor installation method. As for the vertical type casing, the drive motor 120 and the compression unit 130 are disposed at upper and lower sides in an axial direction, respectively. As for the horizontal type casing, the drive motor 120 and the compression unit 130 are disposed at left and right or lateral sides, respectively. The casing according to this embodiment may be illustrated as the vertical type.

The casing 110 includes an intermediate shell 111 having a cylindrical shape, a lower shell 112 covering a lower end of the intermediate shell 111, and an upper shell 113 covering an upper end of the intermediate shell 111. The drive motor 120 and the compression unit 130 may be inserted into the intermediate shell 111 to be fixed thereto, and a suction pipe 115 may penetrate through the intermediate shell 111 to be directly connected to the compression unit 130. The lower shell 112 may be coupled to the lower end of the intermediate shell 111 in a sealing manner, and an oil storage space 110*b* in which oil to be supplied to the compression unit 130 is stored may be disposed below the compression unit 130. The upper shell 113 may be coupled to the upper end of the intermediate shell 111 in a sealing manner, and an oil separation space 110*c* may be disposed above the drive motor 120 to separate oil from refrigerant discharged from the compression unit 130.

The drive motor 120 that constitutes a motor unit supplies power to cause the compression unit 130 to be driven. The drive motor 120 includes a stator 121, a rotor 122, and the rotary shaft 123.

The stator 121 may be fixedly inserted into the casing 110. The stator 121 may be fixed to an inner circumferential surface of the casing 110 in a shrink-fitting manner, for example. For example, the stator 121 may be press-fitted into an inner circumferential surface of the intermediate shell 111.

The rotor 122 may be rotatably inserted into the stator 121, and the rotary shaft 123 may be press-fitted into a center of the rotor 122. Accordingly, the rotary shaft 123 rotates concentrically together with the rotor 122.

An oil passage 125 having a hollow hole shape is disposed in a central portion of the rotary shaft 123, and oil passage holes 126*a*, 126*b* are disposed through a middle portion of the oil passage 125 toward an outer circumferential surface of the rotary shaft 123. The oil passage holes 126*a*, 126*b* include a first oil passage hole 126*a* belonging to a range of a main bush portion 1312 described hereinafter and a second oil passage hole 126*b* belonging to a range of a second bearing portion 1322. Each of the first oil passage hole 126*a* and the second oil passage hole 126*b* may be provided as one or as a plurality. In this embodiment, each of the first and second oil passage holes is provided as a plurality.

An oil pickup 127 may be installed in or at a middle or lower end of the oil passage 125. A gear pump, a viscous pump, or a centrifugal pump may be used for the oil pickup 127. This embodiment illustrates a case in which the centrifugal pump is employed. Accordingly, when the rotary shaft 123 rotates, oil filled in the oil storage space 110*b* of the casing 110 may be pumped by the oil pickup 127, and the oil may be suctioned up along the oil passage 125 and then supplied to a sub bearing surface 1322*b* of sub bush portion 1322 through the second oil through hole 126*b*, and to a main bearing surface 1312*b* of main bush portion 1312 through the first oil through hole 126*a*.

The compression unit 130 includes a main bearing 131, a sub bearing 132, a cylinder 133, a roller 134, and a plurality of vanes 135 (1351, 1352, 1353). The main bearing 131 and the sub bearing 132 are respectively provided at both upper and lower sides of the cylinder 133 to define a compression space V together with the cylinder 133, the roller 134 is rotatably provided in the compression space V, and the plurality of vanes 1351, 1352, 1353 is slidably inserted into the roller 134 to divide the compression space V into a plurality of compression chambers.

Referring to FIGS. 1 to 3, the main bearing 131 may be fixedly installed in the intermediate shell 111 of the casing 110. For example, the main bearing 131 may be inserted into the intermediate shell 111 and welded thereto.

The main bearing 131 may be coupled to an upper end of the cylinder 133 in a close contact manner. Accordingly, the main bearing 131 defines an upper surface of the compression space V, and supports an upper surface of the roller 134 in the axial direction while supporting an upper-half portion of the rotary shaft 123 in a radial direction.

The main bearing 131 may include a main plate portion 1311 and a main bush portion 1312. The main plate portion 1311 covers an upper part or portion of the cylinder 133 to be coupled thereto, and the main bush portion 1312 axially extends from a center of the main plate portion 1311 toward the drive motor 120 so as to support the upper portion of the rotary shaft 123.

The main plate portion 1311 may have a disk shape, and an outer circumferential surface of the main plate portion 1311 may be fixed to the inner circumferential surface of the intermediate shell 111 in a close contact manner. One or more discharge ports 1313*a*, 1313*b*, 1313*c* may be disposed in the main plate portion 1311. A plurality of discharge valves 1361, 1362, 1363 configured to open and close the respective discharge ports 1313*a*, 1313*b*, 1313*c* may be installed on an upper surface of the main plate portion 1311. A discharge muffler 137 having a discharge space (no reference numeral) may be provided at an upper part or portion of the main plate portion 1311 to accommodate the discharge ports 1313*a*, 1313*b*, 1313*c*, and the discharge valves 1361, 1362, 1363. The discharge ports will be described hereinafter.

A first main back pressure pocket 1315*a* and a second main back pressure pocket 1315*b* may be disposed in a lower surface of the main plate portion 1311 facing the upper surface of the roller 134, of both axial side surfaces of the main plate portion 1311. The first main back pressure pocket 1315*a* and the second main back pressure pocket 1315*b* each having an arcuate shape may be disposed at a preset or predetermined interval in a circumferential direction. Each of the first main back pressure pocket 1315*a* and the second main back pressure pocket 1315*b* may have an inner circumferential surface with a circular shape, but may have an outer circumferential surface with an oval or elliptical shape in consideration of vane slots described hereinafter.

The first main back pressure pocket 1315*a* and the second main back pressure pocket 1315*b* may be disposed within an outer diameter range of the roller 134. Accordingly, the first main back pressure pocket 1315*a* and the second main back pressure pocket 1315*b* may be separated from the compression space V. However, the first main back pressure pocket 1315*a* and the second main back pressure pocket 1315*b* may slightly communicate with each other through a gap between a lower surface of the main plate portion 1311 and the upper surface of the roller 134 facing each other unless a separate sealing member is provided therebetween.

The first main back pressure pocket 1315*a* forms a pressure lower than pressure formed in the second main back pressure pocket 1315*b*, for example, forms an intermediate a pressure between a suction pressure and a discharge pressure. Oil (refrigerant oil) may pass through a fine passage between a first main bearing protrusion 1316*a* described hereinafter and the upper surface 134*a* of the roller 134 so as to be introduced into the first main back pressure pocket 1315*a*. The first main back pressure pocket 1315*a* may be disposed in the range of a compression chamber forming intermediate pressure in the compression space V. This may allow the first main back pressure pocket 1315*a* to maintain the intermediate pressure.

The second main back pressure pocket 1315*b* may form a pressure higher than that in the first main back pressure pocket 1315*a*, for example, a discharge pressure or an intermediate pressure between a suction pressure close to the discharge pressure and the discharge pressure. Oil flowing into the main bearing hole 1312*a* of the main bearing 1312 through the first oil passage hole 126*a* may be introduced into the second main back pressure pocket 1315*b*. The second main back pressure pocket 1315*b* may be disposed in the range of a compression chamber forming a discharge pressure in the compression space V. This may allow the second main back pressure pocket 1315*b* to maintain the discharge pressure.

Further, a first main bearing protrusion 1316*a* surrounding a circumference of the first main back pressure pocket 1315*a* may be disposed around the first main back pressure pocket 1315*a*, and a second main bearing protrusion 1316*b* surrounding a circumference of the second main back pressure pocket 1315*b* may be disposed around the second main back pressure pocket 1315*b*. Accordingly, the first main back pressure pocket 1315*a* and the second main back pressure pocket 1315*b* may be sealed to the outside, and at the same time, the rotary shaft 123 may be stably supported.

The first main bearing protrusion 1316*a* and the second main bearing protrusion 1316*b* may be separately disposed so as to independently surround the main back pressure pockets 1315*a*, 1315*b*, respectively, or may be disposed in an integrally connected manner so as to collectively surround the main back pressure pockets 1315*a*, 1315*b*. In this embodiment, there is illustrated an example in which the first main bearing protrusion 1316*a* and the second main bearing protrusion 1316*b* are integrally disposed.

The first main bearing protrusion 1316*a* and the second main bearing protrusion 1316*b* may be disposed at a same height, and an oil communication groove (not shown) or an oil communication hole (not shown) may be disposed on an inner circumferential end surface of the second main bearing protrusion 1316*b*. Alternatively, an inner circumferential height of the second main bearing protrusion 1316*b* may be disposed to be lower than that of the first main bearing protrusion 1316*a*. Accordingly, high-pressure oil (refrigerant oil) flowing into the main bearing surface 1312*b* flows into the second main back pressure pocket 1315*b*, and the second main back pressure pocket 1315*b* forms a relatively high pressure (discharge pressure) compared to the first main back pressure pocket 1315*a*.

The main bush portion 1312 may be formed in a hollow bush shape, and a first oil groove (not shown) may be disposed in an inner circumferential surface of the main bearing hole 1312*a* that defines an inner circumferential surface of the main bush portion 1312. The first oil groove (not shown) may be defined in a straight or inclined shape between upper and lower ends of the main bush portion 1312 to communicate with the first oil passage hole 126*a*.

Referring to FIGS. 1 to 3, the sub bearing 132 may be coupled to a lower end of the cylinder 133 in a close contact manner. Accordingly, the sub bearing 132 defines a lower surface of the compression space V, and supports a lower surface of the roller 134 in the axial direction while supporting a lower-half portion of the rotary shaft 123 in the radial direction.

The sub bearing 132 may include a sub plate portion 1321 and the sub bush portion 1322. The sub plate portion 1321 covers a lower part or portion of the cylinder 133 to be coupled to thereto, and the sub bush portion 1322 axially extends from a center of the sub plate portion 1321 toward the lower shell 112 so as to support the lower portion of the rotary shaft 123. The sub plate portion 1321 may have a disk shape like the main plate portion 1311, and an outer circumferential surface of the sub plate portion 1321 may be spaced apart from the inner circumferential surface of the intermediate shell 111.

A first sub back pressure pocket 1325*a* and a second sub back pressure pocket 1325*b* may be disposed on an upper surface of the sub plate portion 1321 facing the lower surface of the roller 134, of both axial side surfaces of the sub plate portion 1321. The first sub back pressure pocket 1325*a* and the second sub back pressure pocket 1325*b* may be symmetric to the first main back pressure pocket 1315*a* and the second main back pressure pocket 1315*b*, respectively, with respect to the roller 134.

For example, the first sub back pressure pocket 1325*a* and the first main back pressure pocket 1315*a* may be symmetric to each other, and the second sub back pressure pocket 1325*b* and the second main back pressure pocket 1315*b* may be symmetric to each other. Accordingly, a first sub bearing protrusion 1326*a* may be disposed on a circumference of the first sub back pressure pocket 1325*a*, and a second sub bearing protrusion 1326*b* may be disposed on a circumference of the second sub back pressure pocket 1325*b*.

Descriptions of the first sub back pressure pocket 1325*a* and the second sub back pressure pocket 1325*b*, and the first sub bearing protrusion 1326*a* and the second sub bearing protrusion 1326*b* are replaced by the descriptions of the first main back pressure pocket 1315*b* and the second main back pressure pocket 1316*b*, and the first main bearing protrusion 1316*a* and the second main bearing protrusion 1316*b*.

However, in some cases, the first sub back pressure pocket 1325*a* and the second sub back pressure pocket 1325*b* may be asymmetric to the first main back pressure pocket 1315*a* and the second main back pressure pocket 1315*b*, respectively, with respect to the roller 134. For example, the first sub back pressure pocket 1325*a* and the second sub back pressure pocket 1325*b* may be disposed to be deeper than the first main back pressure pocket 1315*a* and the second main back pressure pocket 1315*b*, respectively.

The sub bush portion 1322 may be formed in a hollow bush shape, and an oil groove (not illustrated) may be disposed in an inner circumferential surface of the sub bearing hole 1322*a* that defines an inner circumferential surface of the sub bush portion 1322. The oil groove (not illustrated) may be defined in a straight or inclined shape between upper and lower ends of the sub bush portion 1322 to communicate with the second oil passage hole 126*b*.

Although not illustrated in the drawings, the back pressure pockets [1315*a*, 1315*b*], [1325*a*, 1325*b*] may be provided only at either one of the main bearing 131 and the sub bearing 132.

The discharge port 1313 may be disposed in the main bearing 131 as described above. However, the discharge port may be disposed in the sub bearing 132, disposed in each of the main bearing 131 and the sub bearing 132, or disposed by penetrating between inner and outer circumferential surfaces of the cylinder 133. This embodiment describes an example in which discharge ports 1313 are disposed in the main bearing 131.

The discharge port 1313 may be provided as one. However, in this embodiment, a plurality of discharge ports 1313*a*, 1313*b*, 1313*c* may be disposed at preset or predetermined intervals along a compression proceeding direction (or a rotational direction of the roller).

In general, in the vane type rotary compressor, as the roller 134 is disposed eccentrically with respect to the compression space V, a proximal point P1 almost in contact between an outer circumferential surface 1341 of the roller 134 and an inner circumferential surface 1332 of the cylinder 133 is generated, and the discharge port 1313 is disposed in a vicinity of the proximal point P1. Accordingly, as the compression space V approaches the proximal point P, a distance between the inner circumferential surface 1332 of the cylinder 133 and the outer circumferential surface 1341 of the roller 134 is greatly decreased, which makes it difficult to secure an area of the discharge port.

As a result, as in this embodiment, the discharge port 1313 may be divided into a plurality of discharge ports 1313*a*, 1313*b*, 1313*c* to be defined along a rotational direction (or compression advancing direction) of the roller 134. Further, the plurality of discharge ports 1313*a*, 1313*b*, 1313*c* may be respectively defined one by one, but may be defined in pairs as in this embodiment.

For example, the discharge ports 1313 according to this embodiment may be arranged in the order of a first discharge port 1313*a*, a second discharge port 1313*b*, and a third discharge port 1313*c* from a discharge port which is nearest to a proximity portion 1332*a*. A distance between the first discharge port 1313*a* and the second discharge port 1313*b* and/or a distance between the second discharge port 1313*b* and the third discharge port 1313*c* may be defined substantially similar to a distance between a preceding vane and a following vane, that is, a circumferential length of each compression chamber.

For example, a distance between the first discharge port 1313*a* and the second discharge port 1313*b* and a distance between the second discharge port 1313*b* and the third discharge port 1313*c* may be defined to be the same. The first distance and the second distance may be defined to be substantially the same as a circumferential length of the first compression chamber V1, a circumferential length of the second compression chamber V2, and a circumferential length of the third compression chamber V3, respectively. Accordingly, instead of one compression chamber communicating with the plurality of discharge ports 1313 or one discharge port 1313 communicating with the plurality of compression chambers, the first discharge port 1313*a* may communicate with the first compression chamber V1, the second discharge port 1313*b* with the second compression chamber V2, and the third discharge port 1313*c* with the third compression chamber V3, respectively.

Although not illustrated, when vane slots 1342*a*, 1342*b*, 1342*c* described hereinafter are disposed at unequal intervals, a circumferential length of each compression chamber V1, V2, V3 may be different, and the plurality of discharge ports may communicate with one compression chamber or one discharge port may communicate with the plurality of compression chambers.

In addition, a discharge groove 1314 may extend from the discharge port 1313 according to this embodiment. The discharge groove 1314 may extend into an arcuate shape along the compression proceeding direction (the rotational direction of the roller). Accordingly, refrigerant, which is not discharged from a preceding compression chamber, may be guided to the discharge port 1313 communicating with a following compression chamber through the discharge groove 1314, so as to be discharged together with refrigerant compressed in the following compression chamber. As a result, residual refrigerant in the compression space V may be minimized to thereby suppress over-compression or excessive compression. Thus, efficiency of the compressor may be enhanced.

The discharge groove 1314 may extend from the last discharge port (for example, the third discharge port) 1313. In the vane rotary compressor, as the compression space V is divided into a suction chamber and a discharge chamber with the proximal portion (proximal point) 1332*a* interposed therebetween, the discharge port 1313 cannot overlap the proximal point P1 located at the proximal portion 1332*a* in consideration of sealing between the suction chamber and the discharge chamber. Accordingly, a remaining space S by which the inner circumferential surface 1332 of the cylinder 133 and the outer circumferential surface 1341 of the roller 134 are spaced apart is disposed between the proximal point P1 and the discharge port 1313 along the circumferential direction, and refrigerant that is not discharged through the last discharge port 1313 remains in the remaining space S. This residual refrigerant may increase pressure of the last compression chamber to thereby cause a decrease in compression efficiency due to over-compression.

However, as in this embodiment, when the discharge groove 1314 extends from the last discharge port 1313 to refrigerant remaining space S, refrigerant remaining in the refrigerant remaining space S may be discharged additionally by flowing back to the last discharge port 1313 through the discharge groove 1314, thereby effectively suppressing a decrease in compression efficiency due to over-compression in the last compression chamber.

Although not illustrated in the drawings, a residual discharge hole may be defined in the remaining space S in addition to the discharge groove 1314. The residual discharge hole may have a smaller inner diameter than the discharge port. Unlike the discharge port, the residual discharge hole may be configured to remain open at all times, rather than being opened and closed by the discharge valve.

In addition, the plurality of discharge ports 1313*a*, 1313*b*, 1313*c* may be opened and closed by discharge valves 1361, 1362, 1363, respectively. Each of the discharge valves 1361, 1362, 1363 may be implemented as a cantilever type reed valve having one (first) end fixed and another (second) end free. These discharge valves 1361, 1362, 1363 are widely known in the typical rotary compressor, so detailed description thereof has been omitted.

Referring to FIGS. 1 to 3, the cylinder 133 according to this embodiment may be in close contact with a lower surface of the main bearing 131 and be coupled to the main bearing 131 by a bolt together with the sub bearing 132. Accordingly, the cylinder 133 may be fixedly coupled to the casing 110 by the main bearing 131.

The cylinder 133 may be defined in an annular shape having a hollow space in its center to define the compression space V. The hollow space may be sealed by the main bearing 131 and the sub bearing 132 to define the compression space V, and the roller 134 described hereinafter may be rotatably coupled to the compression space V.

The cylinder 133 may be provided with a suction port 1331 penetrating from an outer circumferential surface to an inner circumferential surface thereof. However, the suction port may alternatively be disposed through the main bearing 131 or the sub bearing 132.

The suction port 1331 may be disposed on one (first) circumferential side of the proximal point P1 described hereinafter. The discharge port 1313 described above may be disposed on the main bearing 131 on the other (second) circumferential side of the proximal point P1 on a side opposite to the suction port 1331.

The inner circumferential surface 1332 of the cylinder 133 may be defined in an elliptical shape. The inner circumferential surface 1332 of the cylinder 133 according to this embodiment may be defined in an asymmetric elliptical shape in which a plurality of ellipses, for example, four ellipses having different major and minor ratios are combined to have two origins.

Referring to FIGS. 1 to 3, the roller 134 according to this embodiment has an outer circumferential surface 1341 defined in a circular shape, and the rotary shaft 123 may be a single body or may be post-assembled and combined therewith at a rotational center Or of the roller 134. Accordingly, the rotational center Or of the roller 134 is coaxially positioned with respect to an axial center (unsigned) of the rotary shaft 123, and the roller 134 rotates concentrically together with the rotary shaft 123.

However, as described above, as the inner circumferential surface 1332 of the cylinder 133 is defined in the asymmetric elliptical shape biased in a specific direction, the rotational center Or of the roller 134 may be eccentrically disposed with respect to an outer diameter center Oc of the cylinder 133. Accordingly, in the roller 134, one side of the outer circumferential surface 1341 is almost in contact with the inner circumferential surface 1332 of the cylinder 133, more specifically, the proximal portion 1332*a* to define the proximal point P1.

The proximal point P1 may be defined in the proximal portion 1332*a* as described above. Accordingly, an imaginary line passing through the proximal point P1 may correspond to a minor axis of an elliptical curve defining the inner circumferential surface 1332 of the cylinder 133.

In addition, the plurality of vane slots 1342*a*, 1342*b*, 1342*c* may be disposed in the outer circumferential surface 1341 of the roller 134 to be spaced apart from each other in the circumferential direction. The plurality of vanes 1351, 1352, 1353 described hereinafter may be slidably inserted into the plurality of vane slots 1342*a*, 1342*b*, 1342*c*, respectively.

The plurality of vane slots 1342*a*, 1342*b*, 1342*c* may be defined as a first vane slot 1342*a*, a second vane slot 1342*b*, and a third vane slot 1342*c* along a compression advancing direction (a rotational direction of the roller 134). The first vane slot 1342*a*, the second vane slot 1342*b*, and the third vane slot 1342*c* may be disposed to be the same as one another at equal or unequal intervals along a circumferential direction.

For example, each of the vane slots 1342*a*, 1342*b*, 1342*c* may be inclined by preset or predetermined angles with respect to the radial direction, so as to secure a sufficient length of each of the vanes 1351, 1352, 1353. Accordingly, when the inner circumferential surface 1332 of the cylinder 133 is defined in the asymmetric elliptical shape, separation of the vanes 1351, 1352, 1353 from the vane slots 1342*a*, 1342*b*, 1342*c* may be suppressed even if a distance from the outer circumferential surface 1341 of the roller 134 to the inner circumferential surface 1332 of the cylinder 133 increases. This may result in enhancing freedom of design for the inner circumferential surface 1332 of the cylinder 133.

A direction in which the vane slots 1342*a*, 1342*b*, 1342*c* are inclined may be a reverse direction to the rotational direction of the roller 134. That is, the front surfaces of the vanes 1351, 1352, 1353 in contact with the inner circumferential surface 1332 of the cylinder 133 may be toward the rotational direction of the roller 134. This may be advantageous in that a compression start angle may be formed ahead in the rotational direction of the roller 134 so that compression may start quickly.

The back pressure chambers 1343*a*, 1343*b*, 1343*c* may be disposed to communicate with the inner ends of the vane slots 1342*a*, 1342*b*, 1342*c*, respectively. The back pressure chambers 1343*a*, 1343*b*, 1343*c* may be spaces in which oil (or refrigerant) of a discharge pressure or an intermediate pressure is filled to flow toward rear sides of the vanes 1351, 1352, 1353, that is, vane rear end surfaces 1351*c*, 1352*c*, 1353*c*. The vanes 1351, 1352, 1353 may be pressed toward the inner circumferential surface of the cylinder 133 by the pressure of the oil (or refrigerant) filled in the back pressure chambers 1343*a*, 1343*b*, 1343*c*. For convenience, hereinafter, a direction toward the cylinder 133 based on a movement direction of the vanes 1351, 1352, 1353 may be defined as a front side and an opposite side as a rear side.

The back pressure chambers 1343*a*, 1343*b*, 1343*c* may be hermetically sealed by the main bearing 131 and the sub bearing 132, respectively. The back pressure chambers 1343*a*, 1343*b*, 1343*c* may independently communicate with the back pressure pockets [1315*a*, 1315*b*], [1325*a*, 1325*b*], respectively, and may also communicate with each other through the back pressure pockets [1315*a*, 1315*b*], [1325*a*, 1325*b*].

Referring to FIGS. 1 to 3, the plurality of vanes 1351, 1352, 1353 according to this embodiment may be slidably inserted into the respective vane slots 1342*a*, 1342*b*, 1342*c*. Accordingly, the plurality of vanes 1351, 1352, 1353 may have substantially a same shape as the respective vane slots 1342*a*, 1342*b*, 1342*c*.

For example, the plurality of vanes 1351, 1352, 1353 may be defined as first vane 1351, second vane 1352, and third vane 1353 along a rotational direction of the roller 134, and the first vane 1351 may be inserted into the first vane slot 1342*a*, the second vane 1352 into the second vane slot 1342*b*, and the third vane 1353 into the third vane slot 1342*c*, respectively.

The plurality of vanes 1351, 1352, 1353 may be defined in substantially the same shape. For example, each of the plurality of vanes 1351, 1352, 1353 may be defined in a substantially rectangular parallelepiped shape, but a vane front end surface 1351*a*, 1352*a*, 1353*a* in contact with an inner circumferential surface 1332 of the cylinder 133 may be defined in a curved shape.

In addition, in the plurality of vanes 1351, 1352, 1353, the vane rear end surfaces 1351*b*, 1352*b*, 1353*b* facing the back pressure chambers 1343*a*, 1343*b*, 1343*c*, and both axial side surfaces [1351*c*, 1352*c*, 1353*c*], [1351*d*, 1352*d*, 1353*d*] and both circumferential side surfaces [1351*e*, 1352*e*, 1353*e*], [1351*f*, 1352*f*, 1353*f*] facing the main bearing 131 and the sub bearing 132 may be respectively defined in a flat surface shape. For the convenience of explanation, hereinafter, of both axial side surfaces, a surface facing the main bearing 131 is defined as a vane upper side surface 1351*c*, 1352*c*, 1353*c*, and a surface facing the sub bearing 132 as a vane lower side surface 1351*d*, 1352*d*, 1353*d*, respectively. Further, of both circumferential side surfaces, a rotational side of the roller 134 is defined as a vane compression surface 1351*e*, 1352*e*, 1353*e*, and a side opposite thereto as a vane compression rear surface 1351*f*, 1352*f*, 1353*f*, respectively.

For the vanes 1351, 1352, 1353 according to this embodiment, an upper side oil supply groove 1355*a*, a lower side oil supply groove 1355*b*, a compression surface oil supply groove 1356*a*, a compression rear surface oil supply groove 1356*b* may be disposed on the vane upper side surface 1351*c*, 1352*c*, 1353*c*, the vane lower side surface 1351*d*, 1352*d*, 1353*d*, the vane compression surface 1351*e*, 1352*e*, 1353*e*, and the vane compression rear surface 1351*f*, 1352*f*, 1353*f*, respectively. Of course, the upper side oil supply groove 1355*a* and the lower side oil supply groove 1355*b*, and the compression surface oil supply groove 1356*a* and the compression rear surface oil supply groove 1356*b* may all be disposed, the upper side oil supply groove 1355*a* and the lower side oil supply groove 1355*b* may only be disposed or the compression surface oil supply groove 1356*a* and the compression rear surface oil supply groove 1356*b* may only be disposed, and any one of the upper side oil supply groove 1355*a*, the lower side oil supply groove 1355*b*, the compression surface oil supply groove 1356*a*, and the compression rear surface oil supply groove 1356*b* may only be disposed. Those discharge grooves will be described hereinafter.

In the vane rotary compressor having the hybrid cylinder, when power is applied to the drive motor 120, the rotor 122 of the drive motor 120 and the rotary shaft 123 coupled to the rotor 122 rotate together, causing the roller 134 coupled to the rotary shaft 123 or integrally configured therewith to rotate together with the rotary shaft 123. Then, the plurality of vanes 1351, 1352, 1353 may be drawn out of the vane slots 1342*a*, 1342*b*, 1342*c* by centrifugal force generated by rotation of the roller 134 and back pressure of the back pressure chambers 1343*a*, 1343*b*, 1343*c*, which support the rear end surfaces 1351*b*, 1353*b*, 1353*b* of the vanes 1351, 1352, 1353, thereby being brought into contact with the inner circumferential surface 1332 of the cylinder 133.

The compression space V of the cylinder 133 may be partitioned by the plurality of vanes 1351, 1352, 1353 into as many compression chambers (including a suction chamber or a discharge chamber) V1, V2, V3 as the number of the vanes 1351, 1352, 1353. The compression chambers V1, V2, V3 may be changed in volume by a shape of the inner circumferential surface 1332 of the cylinder 133 and eccentricity of the roller 134 while moving in response to the rotation of the roller 134. Accordingly, refrigerant suctioned into the respective compression chambers V1, V2, V3 may be compressed while moving along the roller 134 and the vanes 1351, 1352, 1353, and discharged into the inner space of the casing 110. Such series of processes are repeatedly carried out.

On the other hand, as described above, the vane rotary compressor according to this embodiment slides in a radial direction while rotating together with the roller in a state in which the vane is inserted into the vane slot of the roller. In this process, the vane rubs against the main bearing and sub bearing as well as against the roller. That is, the vane upper side surface and the vane lower side surface are in contact with the main bearing and the sub bearing, respectively, and the vane compression surface and the vane compression rear surface are in contact with an inner surface of the vane slot, respectively, thereby causing friction loss and wear between surfaces in contact with each other.

As a result, in this embodiment, an oil supply groove may be disposed on an axial side surface of the vane, thereby suppressing friction loss or wear between the axial side surface of the vane and the main bearing or/and sub bearing facing the vane, and a circumferential side surface of the vane and the roller facing the vane. As the first to third vanes according to this embodiment are defined in substantially the same shape, the first vane will be described below as a representative example.

Figure 4:
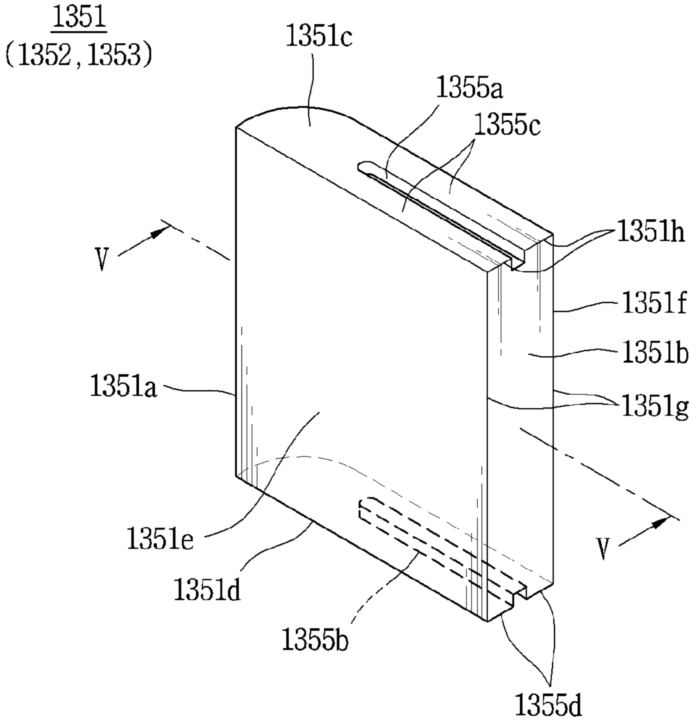
FIG. 4 is a perspective view showing a vane in FIG. 1.
Figure 5:
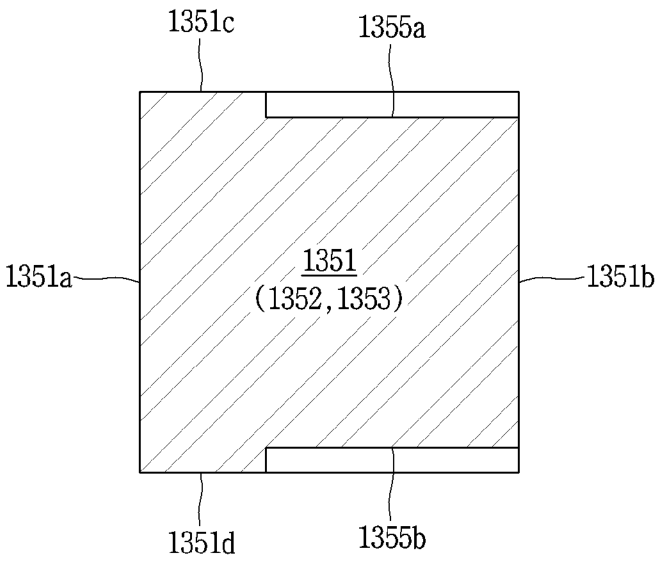
FIG. 5 is a cross-sectional view, taken along line "V-V" in FIG. 4.
Figure 6:
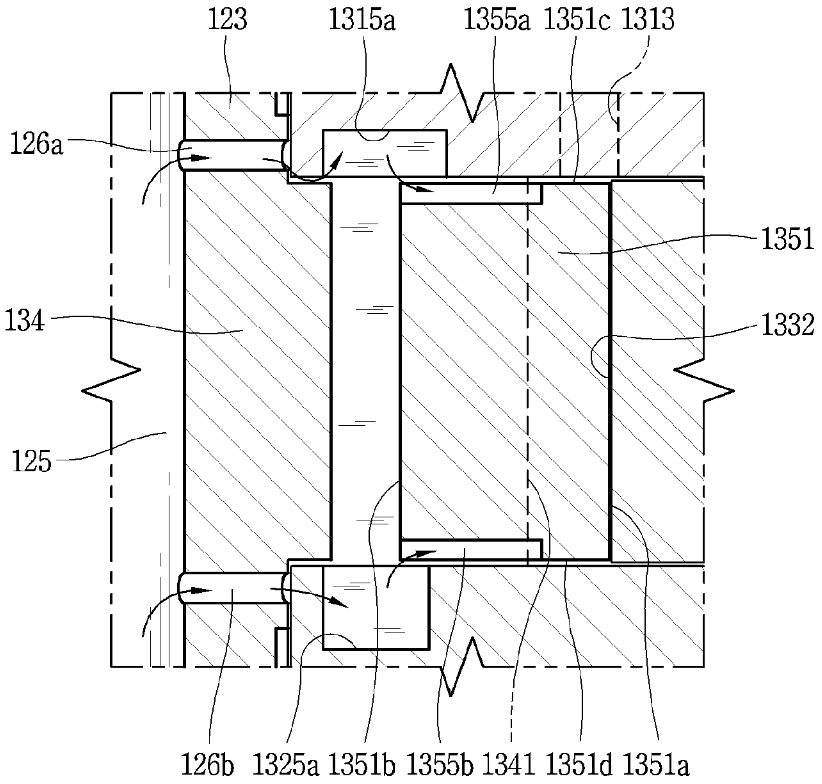
FIG. 6 is a cross-sectional view showing a process of flowing oil into an oil supply groove in FIG. 1.

FIG. 4 is a perspective view showing a vane in FIG. 1. FIG. 5 is a cross-sectional view, taken along line "V-V" in FIG. 4. FIG. 6 is a cross-sectional view showing a process of flowing oil into an oil supply groove in FIG. 1.

Referring to FIGS. 4 to 6, the first vane 1351 according to this embodiment may be defined in a substantially rectangular parallelepiped shape as described above, but the vane front end surface 1351*a* may be defined in a curved shape while the other surface, that is, the vane rear end surface 1351*b*, the vane upper side surface 1351*c*, the vane lower side surface 1351*d*, the vane compression surface 1351*e*, and the vane compression rear surface 1351*f* may be respectively defined in a substantially flat surface shape.

However, in the first vane 1351 according to this embodiment, the upper side oil supply groove 1355*a* may be disposed on the vane upper side surface 1351*c* in contact with the main plate portion 1311 of the main bearing 131, and the lower side oil supply groove 1355*b* may be disposed on the vane lower side surface 1351*d* in contact with the sub plate portion 1321. More specifically, the upper side oil supply groove 1355*a* may extend in an elongated manner from an edge (hereinafter referred to as a first edge) 1351*g* where the vane upper side surface 1351*c* and the vane rear end surface 1351*b* of the first vane 1351 adjoin each other toward the vane front end surface 1351*a*. The upper side oil supply groove 1355*a* may be disposed to have a same cross-sectional area or a same volume along a lengthwise direction of the upper side oil supply groove 1355*a*. Accordingly, the upper side oil supply groove 1355*a* may communicate with the first back pressure chamber 1343*a* through the first vane slot 1342*a* into which the first vane 1351 is inserted, thereby allowing oil flowing into the first back pressure chamber 1343*a* to be introduced quickly and uniformly into the upper side oil supply groove 1355*a*.

More specifically, the upper side oil supply groove 1355*a* may be located at a widthwise center of the vane upper side surface 1351*c*. Accordingly, upper side sealing portions 1355*c*, 1355*c* may be disposed on both widthwise sides of the upper side oil supply groove 1355*a*, respectively.

A width of the upper side oil supply groove 1355*a* may be defined to be less than ½ of a width of the vane upper side surface 1351*c*. For example, a width D11 of the upper side oil supply groove 1355*a* may be smaller than or equal to a width D12 of the upper side sealing portions 1355*c*, 1355*c* located on both widthwise sides of the upper side oil supply groove 1355*a*.

In other words, the width D12 of the upper sealing portions 1355*c*, 1355*c* may be greater than or equal to the width D11 of the upper oil supply groove 1355*a*. Accordingly, the upper side sealing portions 1355*c*, 1355*c* may secure a sealing distance at the vane upper side surface 1351*c* to suppress leakage between compression chambers disposed on both circumferential sides of the first vane 1351, respectively.

Although not shown in the drawing, the upper side oil supply groove 1355*a* may also be disposed to be slightly eccentric toward the vane compression surface 1351*e* or vane compression rear surface 1351*f* from a widthwise center of the vane upper side surface 1351*c*. For example, the upper side oil supply groove 1355*a* may be disposed to be slightly eccentric toward the vane compression surface 1351*e* from the widthwise center of the vane upper side surface 1351*c*. Accordingly, it may be possible to suppress oil in the upper side oil supply groove 1355*a* forming a substantially discharge pressure from leaking into a compression chamber on a side of the vane compression rear surface 1351*f* forming a relatively low pressure.

Further, the upper side oil supply groove 1355*a* may be defined as a single groove in which both ends thereof communicate with each other. Accordingly, oil flowing from the first back pressure chamber 1343*a* to a rear end of the upper side oil supply groove 1355*a* may quickly move to a front end of the upper side oil supply groove 1355*a* to advantageously form an oil film on the entire vane upper side surface 1351*c*.

In addition, the upper side oil supply groove 1355*a* may extend in an elongated manner toward the vane front end surface 1351*a*, but an end on a side of a front end thereof may be disposed to such an extent that it does not communicate with the discharge ports 1313*a*, 1313*b*, 1313*c*. For example, when a plurality of discharge ports 1313*a*, 1313*b*, 1313*c* are disposed along a circumferential direction in the main plate portion 1311 of the main bearing 131, an end on a side of a front end of the upper oil supply groove 1355*a* may be disposed within an imaginary circle C connecting inner ends of the discharge port 1313*a*, 1313*b*, 1313*c* (points adjacent to the rotary shaft). Accordingly, it may be possible to suppress oil from leaking toward the discharge ports 1313*a*, 1313*b*, 1313*c* through the upper side oil supply groove 1355*a*. With this structure, an abnormal behavior of the discharge valves 1361, 1362, 1363 opening and closing the discharge ports 1313*a*, 1313*b*, 1313*c* may be suppressed. In addition, it may be possible to suppress oil from flowing out through the discharge ports 1313*a*, 1313*b*, 1313*c* while at the same time allowing high-pressure oil to flow into a relatively low-pressure compression chamber so as to prevent over-compression from occurring in the compression chamber.

The lower side oil supply groove 1355*b* may be symmetrical to the upper side oil supply groove 1355*a* as described above. Accordingly, the lower side oil supply groove 1355*b* may be disposed at a center of the vane lower surface 1351*d*, and lower side sealing portions 1355*d* may be disposed on both widthwise sides of the lower side oil supply groove 1355*b*. The configuration of the lower side oil supply groove 1355*b* and the lower side sealing portion 1355*d* and operational effect thereof will be replaced with the description of the upper side oil supply groove 1355*a* and the upper side sealing portion 1355*c*.

In the vane rotary compressor as described above, when the compressor is driven, the roller 134 rotates along with the rotary shaft 123, and when the roller 134 rotates, the first vane 1351 coupled to the roller 134 rotates together.

At this time, the first vane 1351 rotates in a circumferential direction together with the roller 134 while at the same time reciprocating in a radial direction along the first vane slot 1342*a*. In this process, the first vane 1351 forms a friction surface with respect to the main bearing 131, the sub bearing 132, and the roller 134.

However, in the first vane 1351, as the upper side oil supply groove 1355*a* and the lower side oil supply groove 1355*b* are disposed on the vane upper side surface 1351*c* and the vane lower side surface 1351*d*, respectively, which form a friction surface, oil in the back pressure chamber 1343*a* flows to a friction surface between the vane upper side surface 1351*c* and the main plate portion 1311 and between a friction surface between the vane lower side surface 1351*d* and the sub plate portion 1321 to lubricate these friction surfaces.

Then, friction loss that may occur between the main bearing 131 and the vane upper side surface 1351*c* of the first vane 1351 and between the sub bearing 132 and the vane lower side surface 1351*d* of the first vane 1351 may be suppressed, thereby increasing compression efficiency. At the same time, the vane upper side surface 1351*c* or the vane lower side surface 1351*d* of the first vane 1351 may be suppressed from being worn, thereby suppressing volume loss due to leakage between compression chambers.

Another embodiment of the oil supply groove will be described as follows.

That is, in the above-described embodiment, the upper side oil supply groove and the lower side oil supply groove may be disposed to be symmetrical to each other, but in some cases, the upper side oil supply groove and the lower side oil supply groove may be disposed to be asymmetrical to each other.

Figure 7:
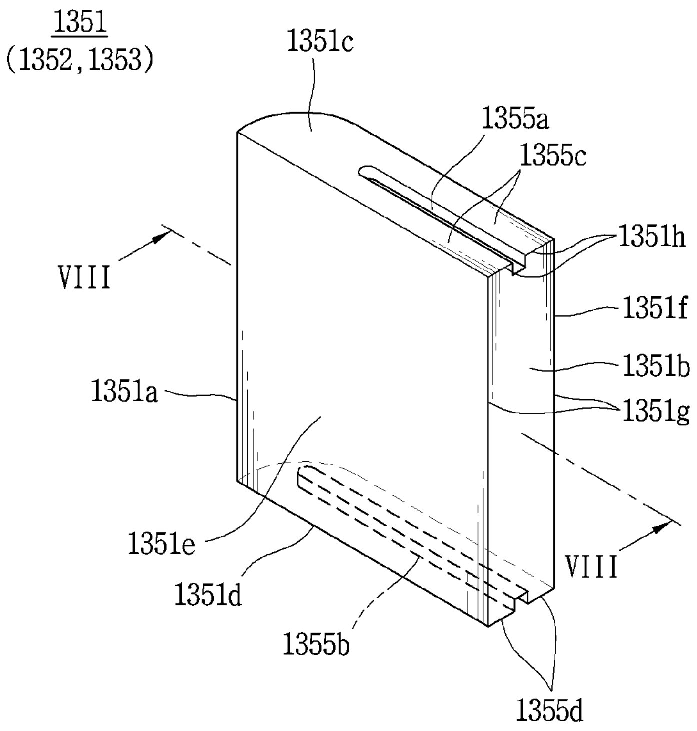
FIG. 7 is a perspective view of an oil supply groove in FIG. 4 according to another embodiment.
Figure 8:
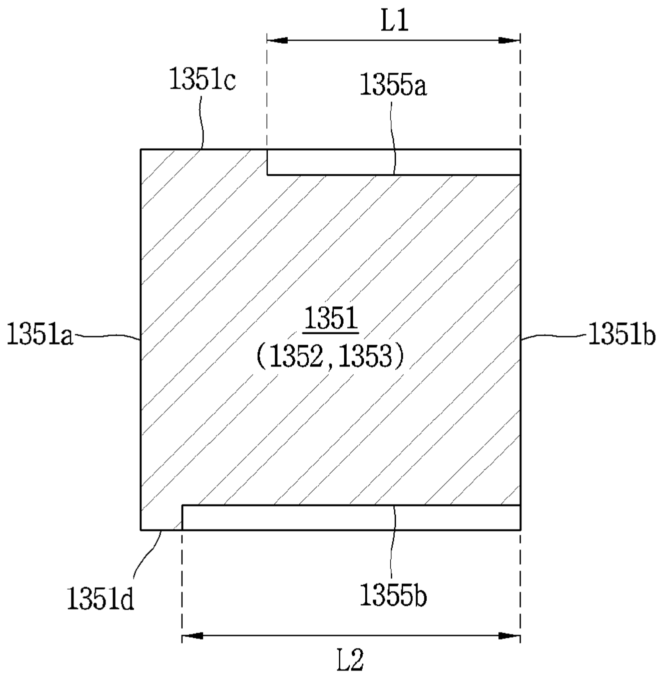
FIG. 8 is a cross-sectional view, taken along line "VIII-VIII" in FIG. 7.

FIG. 7 is a perspective view of an oil supply groove in FIG. 4 according to another embodiment. FIG. 8 is a cross-sectional view, taken along line "VIII-VIII" in FIG. 7.

Referring to FIGS. 7 and 8, the first vane 1351 according to this embodiment may be defined in a rectangular parallelepiped shape as described above, but the upper side oil supply groove 1355*a* and the lower side oil supply groove 1355*b* may be disposed on the vane upper side surface 1351*c* and the vane lower side surface 1351*d*, respectively. A basic configuration and operational effects of the upper side oil supply groove 1355*a* and the lower side oil supply groove 1355*b* are similar to those of the previous embodiment of FIG. 4, and thus, detailed description thereof has been omitted.

However, in this embodiment, a length L1 of the upper side oil supply groove 1355*a* and a length L2 of the lower side oil supply groove 1355*b* may be defined to be different from each other. For example, discharge ports 1313*a*, 1313*b*, 1313*c* are disposed in the main bearing 131, but no discharge ports are disposed in the sub bearing 132. Accordingly, the upper side oil supply groove 1355*a* facing the main bearing 131 may be disposed so as not to overlap the discharge ports 1313*a*, 1313*b*, 1313*c*. However, the lower side oil supply groove 1355*b* facing the sub bearing 132 may be disposed up to a position close to the vane front end surface 1351*a* as a restriction condition for the discharge port is excluded.

In other words, when the discharge ports 1313*a*, 1313*b*, 1313*c* are disposed only in the main bearing 131 and the discharge ports are not disposed in the sub bearing 132, the length L1 of the upper oil supply groove 1355*a* may be shorter than the length L2 of the oil supply groove 1355*b*. As described above, when the length L2 of the lower side oil supply groove 1355*b* is larger than the length L1 of the upper side oil supply groove 1355*a*, a larger amount of oil may be supplied farther to a friction surface formed by the vane lower side surface 1351*b* through the lower side oil supply groove 1355*b* to advantageously form a uniform oil film. Further, the vane may cause more friction loss or wear on the vane lower side surface 1351*d* than the vane upper side surface 1351*c* due to its own weight, but the length L2 of the lower side oil supply groove 1355*b* may be larger than the length L1 of the upper side oil supply groove 1355*a*, thereby more effectively suppressing the aforementioned friction loss and wear.

Although not shown in the drawings, when the discharge port is located on a side opposite thereto, the length L2 of the lower side oil supply groove 1355*b* may be shorter than the length L1 of the upper side oil supply groove 1355*a*.

Although not shown in the drawings, it may be disposed on only either one side of the upper side oil supply groove 1355*a* and the lower side oil supply groove 1355*b*. In this case, it may be provided on the lower side oil supply groove 1355*b* in which a relatively large amount of oil is stored or an axial side surface of a bearing facing a bearing with no discharge port.

Still another embodiment of the oil supply groove will be described as follows.

That is, in the above-described embodiments, the oil supply groove may be provided with the same volume toward the vane end surface, but in some cases, the oil supply groove may also be provided with a different volume toward the vane end surface.

Figure 9:
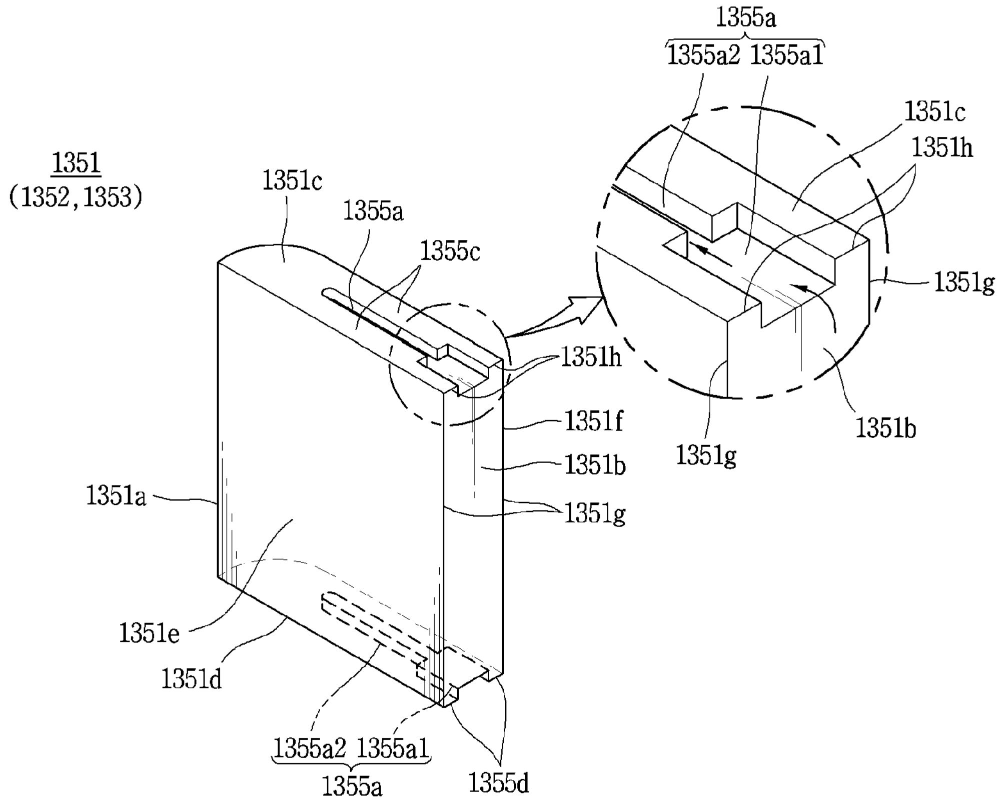
FIGS. 9 and 10 are perspective views of the oil supply groove in FIG. 4 according to still another embodiment.
Figure 10:
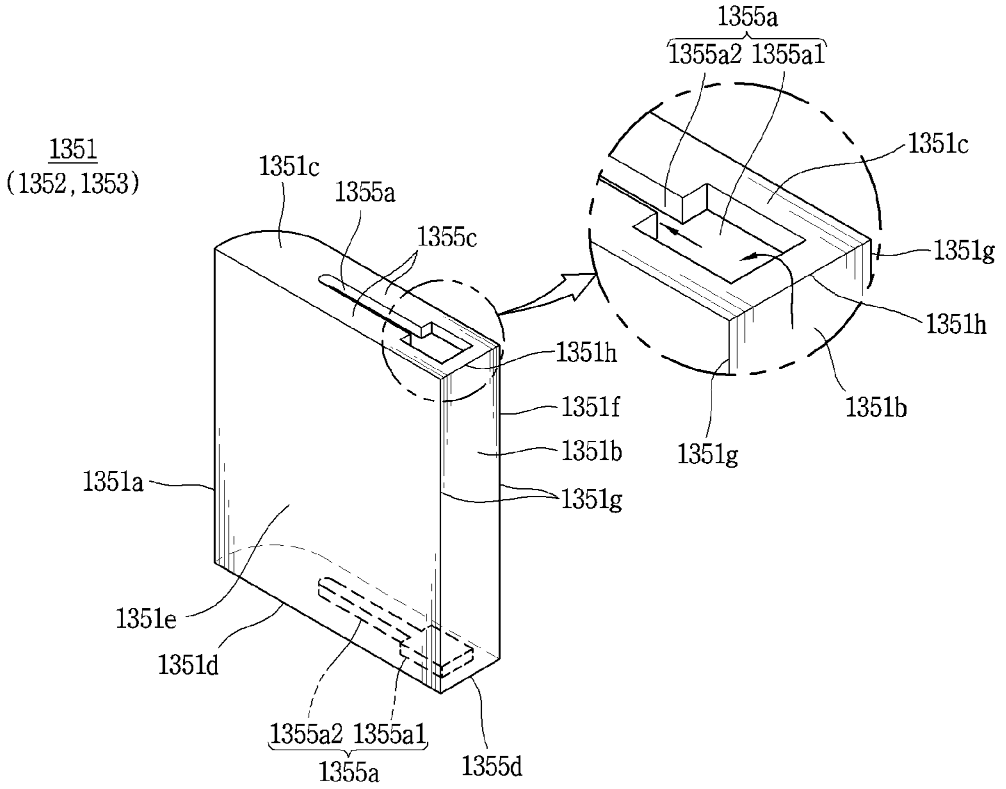

FIGS. 9 and 10 are perspective views of the oil supply groove in FIG. 4 according to still another embodiment.

Referring to FIG. 9, the upper side oil supply groove 1355*a* and the lower side oil supply groove 1355*b* according to this embodiment may be provided in a plurality of sizes. For example, in the upper side oil supply groove 1355*a*, a first oil supply groove 1355*a*1 may be disposed in a direction from a first edge 1351*g* toward the vane front end surface 1351*a*, and a second oil supply groove 1355*a*2 may further extend in a direction from an end of the first oil supply groove 1355*a*1 toward the vane front end surface 1351*a*.

A radial width (hereinafter, referred to as a width) D21 of the first oil supply groove 1355*a*1 may be larger than a width D22 of the second oil supply groove 1355*a*2. Accordingly, a frictional area between the vane upper side surface 1351*c* and the main bearing 131 facing the vane may be reduced while at the same time extending the lubrication area to that extent so as to reduce friction loss or wear between the first vane 1351 and the main bearing 131. Further, when the width D21 of the first oil supply groove 1355*a*1 is larger than the width D22 of the second oil supply groove 1355*a*2, oil stored in the first back pressure chamber 1343*a* may quickly flow into the first oil supply groove 1355*a*1, or a predetermined amount of oil may be stored in the first oil supply groove 1355*a*1, thereby allowing oil to more quickly flow into the second oil supply groove 1355*a*2.

In addition, as shown in FIG. 10, the first oil supply groove 1355*a*1 may be spaced apart from the first edge 1351*g*. As second oil supply groove 1355*a*2 is the same as the second oil supply groove 1355*a*2 of the above-described embodiment, description thereof has been omitted.

As described above, when the first oil supply groove 1355*a*1 is spaced apart from the first edge 1351*g*, a type of oil pocket may be disposed on the vane upper side surface 1351*c*. Then, even when the compressor stops, a predetermined amount of oil may be filled and preserved in the first oil supply groove 1355*a*1 constituting the oil pocket. Then, when the compressor is restarted, oil stored in the first oil supply groove 1355*a*1 may be quickly supplied to a friction surface between the first vane 1351 and the main bearing 131, thereby more effectively suppressing friction loss and wear.

The lower side oil supply groove **1355*b* may also be disposed in the same way as the upper side oil supply groove 1355*a*, and operational effects thereof may also be similar. In addition, even in these cases, as described in the above-described embodiment, the lower side oil supply groove 1355*b* may be excluded, and the upper side oil supply groove 1355*a* may be excluded and only the lower side oil supply groove 1355*b*** may be provided. Even in these cases, the configuration and operational effects thereof may be the same.

Although not shown in the drawings, while the width D21 of the first oil supply groove **1355*a*1 and the width D22 of the second oil supply groove 1355*a*2 are the same or different from each other, a depth of the first oil supply groove 1355*a*1 may be deeper than that of the second oil supply groove 1355*a*2. Even in this case, the operational effects may be the same as those of the above-described embodiment, that is, an embodiment in which the width D21 of the first oil supply groove 1355*a*1 is larger than the width D22 of the second oil supply groove 1355*a*2**.

Yet still another embodiment of the oil supply groove will be described as follows.

That is, in the above-described embodiments, the oil supply groove may be disposed on the vane upper side surface or/and the vane lower side surface, but in some cases, the oil supply groove may be disposed on the vane compression surface or/and the vane compression rear surface.

Figure 11:
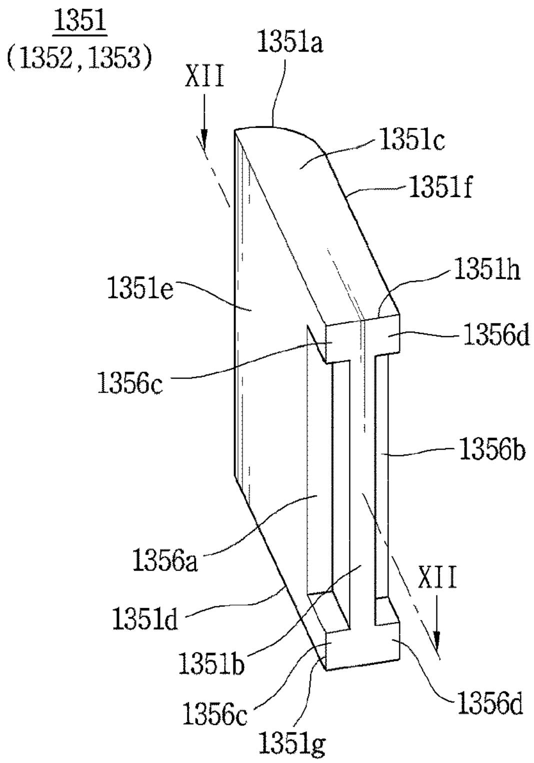
FIG. 11 is a perspective view of the vane in FIG. 1 according to another embodiment.
Figure 12:
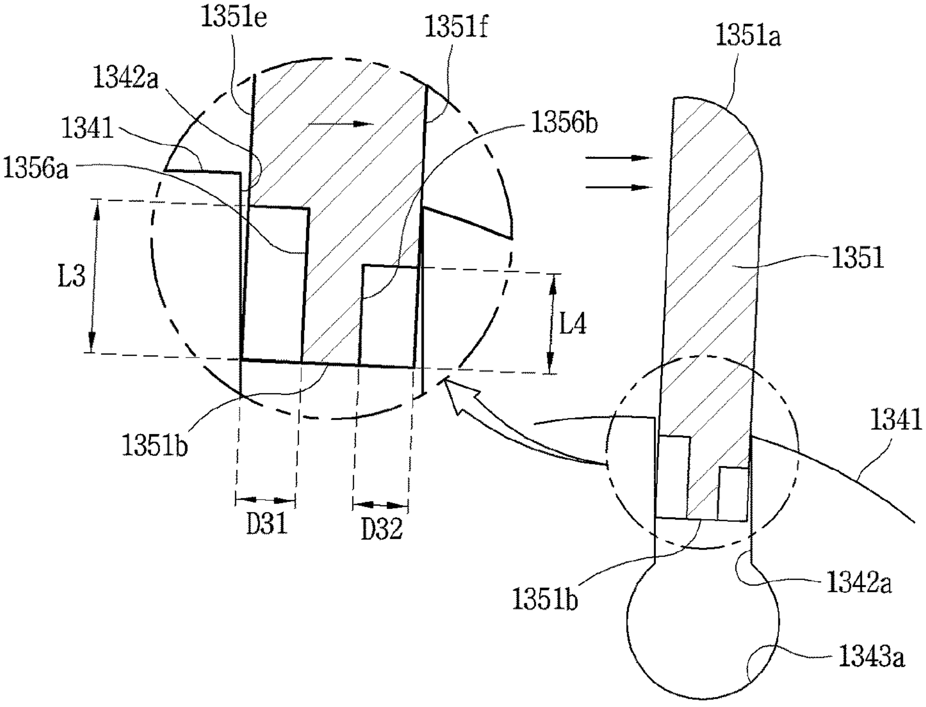
FIG. 12 is a cross-sectional view taken along line "XI-XI" in FIG. 11.

FIG. 11 is a perspective view of the vane in FIG. 1 according to another embodiment. FIG. 12 is a cross-sectional view, taken along "XII-XII" in FIG. 11.

Referring to FIGS. 11 and 12, the first vane 1351 according to this embodiment may be defined in a rectangular parallelepiped shape as described above, but the compression surface oil supply groove **1356*a* and the compression rear surface oil supply groove 1356*b* may be disposed on both circumferential side surfaces, that is, the vane compression surface 1351*e* and the vane compression rear surface 1351*f***, respectively.

The compression surface oil supply groove **1356*a* may be disposed in a stepwise manner at an edge (hereinafter, referred to as a second edge) 1351*h* where the vane compression surface 1351*e* and the vane rear end surface 1351*b* adjoin each other. For example, the compression surface oil supply groove 1356*a* may be recessed in a rectangular parallelepiped shape by a predetermined depth at the second edge 1351*h*** to be disposed in a stepwise manner.

In this case, as the compression surface oil supply groove **1356*a* is disposed in the middle of the second edge 1351*h*, compression surface support portions 1356*c* excluded from the compression surface oil supply groove 1356*a* may be disposed at both axial ends of the second edge 1351*h*, respectively. An axial length of both compression surface support portions 1356*c* may be shorter than that of the compression surface oil supply groove 1356*a*, and a total length of a sum of the axial lengths of both compression surface support portions 1356*c* may also be shorter than the axial length of the compression surface oil supply groove 1356*a*. Accordingly, an inner end on a side of a compression surface of the first vane 1351 may be supported by the compression surface support portion 1356*c*, thereby preventing the vane front end surface 1351*c* of the first vane 1351 from being excessively pushed in a reverse rotational direction of the roller 134**.

The compression surface oil supply groove **1356*a* may have a same depth and a same area along an axial direction. Accordingly, a back pressure due to oil accommodated in the compression surface oil supply groove 1356*a*** may be formed in a substantially uniform manner in all sections along an axial direction, thereby stabilizing behavior of the vane.

However, in the compression surface oil supply groove **1356*a*, when the first vane 1351 reciprocates to be drawn into or out of the roller 134, a distance from the compression chamber varies depending on the location of the first vane 1351 with respect to the roller 134. Due to this, when the compression surface oil supply groove 1356*a* is too long in a direction toward the vane front end surface 1351*a*, that is, in a radial direction, a sealing distance between the compression surface oil supply groove 1356*a* and the compression chamber V, that is, a proper distance to an outer circumferential surface of the roller 134** may not be secured.

Therefore, in this embodiment, a radial length L3 of the compression surface oil supply groove **1356*a* may be provided to properly secure a length located inside of the first vane slot 1342*a* even when the first vane 1351 is maximally drawn out, for example, a sealing distance defined as a distance (interval) between the compression surface oil supply groove 1356*a* and an outer circumferential surface of the roller 134 at the time when the first vane 1351 is maximally drawn out as in this embodiment in a case where an inner circumferential surface 1332 of the cylinder 133** is defined in an asymmetric elliptical shape by combining a plurality of ellipses. Although a minimum sealing distance differs depending on the standard of the compressor, it is advantageous to secure about 1.0 to 2.0 mm.

It may also be defined in relation to the compression rear surface oil supply groove **1356*b* described hereinafter. For example, as in this embodiment, when the first vane 1351 is inclined by a predetermined angle with respect to the rotational center Or of the roller 134, the compression surface oil supply groove 1356*a* and the compression rear surface oil supply groove 1356*b*** may have different lengths.

In other words, when the vane front end surface **1351*a* of the first vane 1351 is inclined toward the rotational direction, that is, the vane compression surface 1351*e*, the length L3 of the compression surface oil supply groove 1356*a* may be larger than a length L4 of the compression rear surface oil supply groove 1356*b*. As shown in FIGS. 3 and 12, as the first vane 1351 is inclined toward the vane compression surface 1351*e*, a minimum length from an outer circumferential surface of the roller 134 to the compression surface oil supply groove 1356*a* becomes larger than a minimum length from the outer circumferential surface of the roller 134 to the compression rear surface oil supply groove 1356*b*. As a result, even when the length L3 of the compression surface oil supply groove 1356*a* is larger than the length L4 of the compression rear surface oil supply groove 1356*b*, a sealing distance from the compression surface oil supply groove 1356*a* to the outer circumferential surface of the roller 134** may be secured.

The compression rear surface oil supply groove **1356*b* may be symmetrical to the previously described compression surface oil supply groove 1356*a*. Accordingly, compression rear surface support portions 1356*d* may be disposed on both axial sides of the compression rear surface oil supply groove 1356*b***, respectively.

A basic configuration and operational effects of the compression rear surface oil supply groove **1356*b* according to this embodiment are similar to those of the compression surface oil supply groove 1356*a* described above, and thus, detailed description thereof will be replaced with the description of the compression surface oil supply groove 1356*a***.

As described above, when the first vane 1351 slides to be drawn into and out of the first vane slot 1342*a* of the roller 134 when driving the compressor, a periphery of the vane rear end surface 1351*b* may come into close contact with both side surfaces of the first vane slot 1342*a*, thereby causing friction loss or wear. However, as in this embodiment, when the compression surface oil supply groove 1356*a* and the compression rear surface oil supply groove 1356*b* are disposed at both second edges 1351*h*, respectively, a friction surface between the compression surface 1351*e* and the compression rear surface 1351*f* of the first vane 1351, and both inner surfaces of the first vane slot 1342*a* facing them, may be lubricated by oil filled in the compression surface oil supply groove 1356*a* and the compression rear surface oil supply groove 1356*b*, thereby suppressing friction loss and wear.

In addition, as the compression surface oil supply groove 1356*a* and the compression rear surface oil supply groove 1356*b* are disposed at the second edge 1351*h* in close contact with an inner surface of the first vane slot 1342*a*, the above-described both second edges 1351*h* are defined in a chamfer shape. Accordingly, a frictional area between an inner surface of the first vane slot 1342*a* and both side surfaces of the first vane 1351 facing the first vane slot may be reduced, thereby suppressing friction loss and wear between the first vane 1351 and the vane slot 1342*a*.

A widthwise depth (hereafter, referred to as a depth) D31 of the compression surface oil supply groove (1356*a*) and a depth D32 of the compression rear surface oil supply groove 1356*b*) may be defined to be the same, but in some cases, may be defined to be different from each other.

Figure 13:
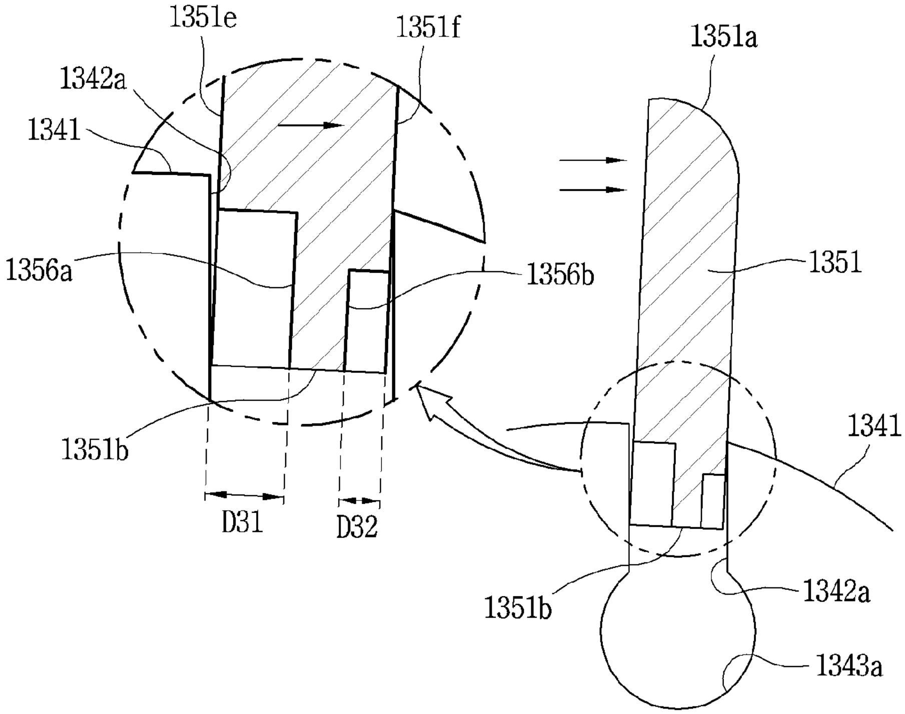
FIG. 13 is a cross-sectional view of an oil supply groove in FIG. 11 according to still another embodiment.

FIG. 13 is a cross-sectional view of an oil supply groove in FIG. 11 according to still another embodiment.

Referring to FIG. 13, a widthwise depth (hereinafter, referred to as a depth) D32 of the compression surface oil supply groove 1356*b* may be smaller than the depth D31 of the compression surface oil supply groove 1356*a*. Accordingly, it may be possible to suppress friction loss and wear at a portion having a largest frictional load, that is, at the second edge 1351*h* where the vane compression surface 1351*e* and the vane rear end surface 1351*b* adjoin each other.

In other words, when the first vane 1351 rotates together with the roller 134, a side of the vane front end surface 1351*a* may be pushed in a reverse rotational direction of the roller 134 due to a gas reaction force of the compression chamber. Then, the vane rear end surface 1351*b* of the first vane 1351 may be pushed in a direction opposite to the vane front end surface 1351*a*, that is, in a rotational side of the roller 134, thereby allowing the second edge 1351*h* to come into most close contact with the first vane slot 1342*a*.

Accordingly, as in this embodiment, when the depth D31 of the compression surface oil supply groove 1356*a* is larger than the depth D32 of the compression rear surface oil supply groove 1356*b* on a side opposite thereto, friction loss and wear at the second edge 1351*h* having a relatively large frictional load may be suppressed.

Still yet another embodiment of the oil supply groove will be described as follows. That is, in the above-described embodiment, the compression surface oil supply groove and the compression rear surface oil supply groove may each be disposed in a stepwise manner, but in some cases, at least one of the compression surface oil supply groove and the compression rear surface oil supply groove may be disposed in an inclined manner.

Figure 14:
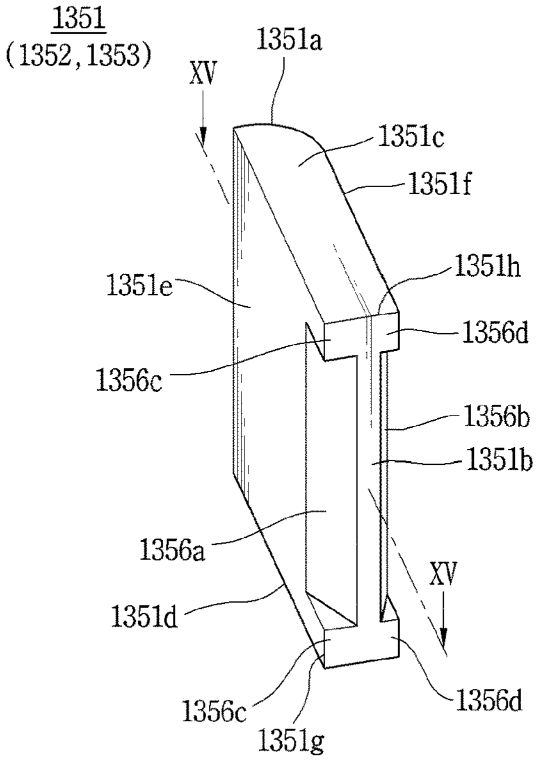
FIG. 14 is a perspective view of the oil supply groove in FIG. 11 according to still another embodiment.
Figure 15:
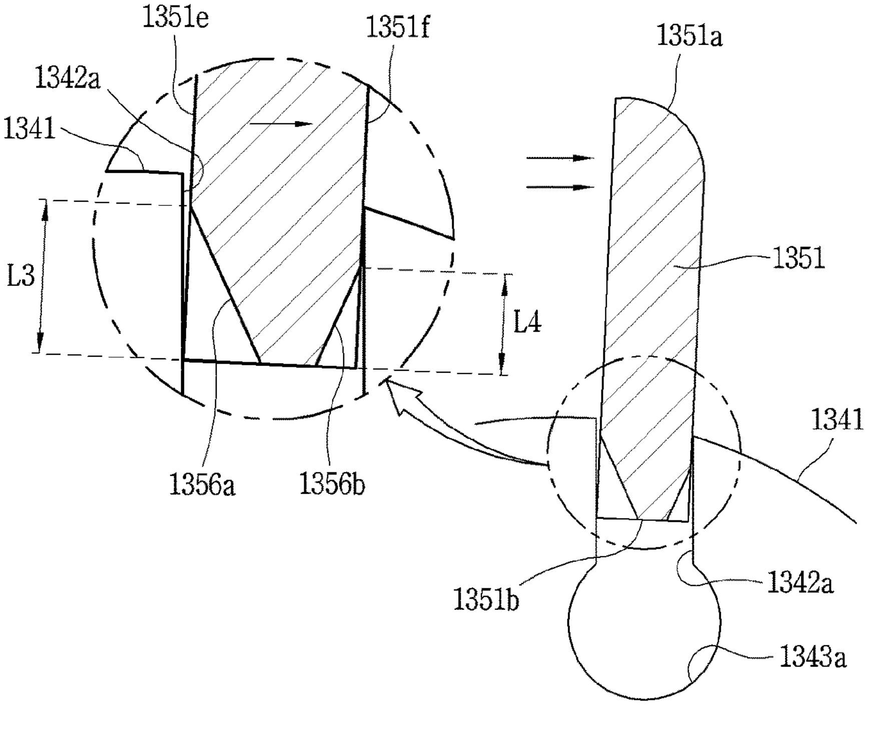
FIG. 15 is a cross-sectional view, taken along line XV-XV" in FIG. 14.

FIG. 14 is a perspective view of the oil supply groove in FIG. 11 according to still another embodiment. FIG. 15 is a cross-sectional view, taken along line "XV-XV" in FIG. 14.

Referring to FIGS. 14 and 15, the first vane 1351 according to this embodiment may be defined in a rectangular parallelepiped shape as described above such that the compression surface oil supply groove 1356*a* is disposed on the vane compression surface 1351*e*, and the compression rear surface oil supply groove 1356*b* on the vane compression rear surface 1351*f*, respectively. The compression surface oil supply groove 1356*a* according to this embodiment may be disposed to be inclined in a frontward-rearward direction at the second edge 1351*h* where the vane compression surface 1351*e* and the vane rear end surface 1351*b* adjoin each other.

For example, the compression surface oil supply groove 1356*a* may be inclined from the middle of the vane rear end surface 1351*b* to the vane front end surface 1351*a*. The compression surface oil supply groove 1356*a* may be disposed at a same inclination angle along radial and axial directions. Accordingly, the compression surface oil supply groove 1356*a* may be defined in a triangular cross-sectional shape having a same depth and a same area along an axial direction, and with this structure, a back pressure by oil accommodated in the compression surface oil supply groove 1356*a* may be generated in the axial direction, thereby stabilizing behavior of the vane.

As described above, even when the compression surface oil supply groove 1356*a* is disposed in an inclined manner, operational effects thereof are similar to those of the compression surface oil supply groove 1356*a* in the previous embodiment of FIG. 11. However, when the compression surface oil supply groove 1356*a* is disposed in an inclined manner as in this embodiment, rigidity of the vane 1351 may be improved while reducing an actual frictional area between the second edge 1351*h* and the vane slot 1342*a*.

In addition, the compression rear surface oil supply groove 1356*b* may be disposed to be symmetrical to the previously described compression surface oil supply groove 1356*a*. A basic configuration and operational effects of the compression rear surface oil supply groove 1356*b* are similar to those of the previously described compression surface oil supply groove 1356*a*, and thus, description thereof will be replaced with the description of the compression surface oil supply groove 1356*a*.

However, even in this embodiment, the length L4 of the compression rear surface oil supply groove 1356*b* may be smaller than the length L3 of the compression surface oil supply groove 1356*a*. Accordingly, the second edge 1351*h* on a side of the vane compression rear surface 1351*f* may reduce a frictional area in close contact with an inner surface of the vane slot 1342*a* facing the second edge 1351*h* in a circumferential direction while securing a proper sealing distance from the vane compression back surface 1351*f* including the compression rear surface oil supply groove 1356*b* to an outer circumferential surface of the roller 134.

Yet still another embodiment of the oil supply groove will be described as follows. That is, in the above-described embodiment, one compression surface oil supply groove and one compression rear surface oil supply groove may be disposed, but in some cases, a plurality of compression surface oil supply grooves and a plurality of compression rear surface oil supply grooves may be disposed.

Figure 16:
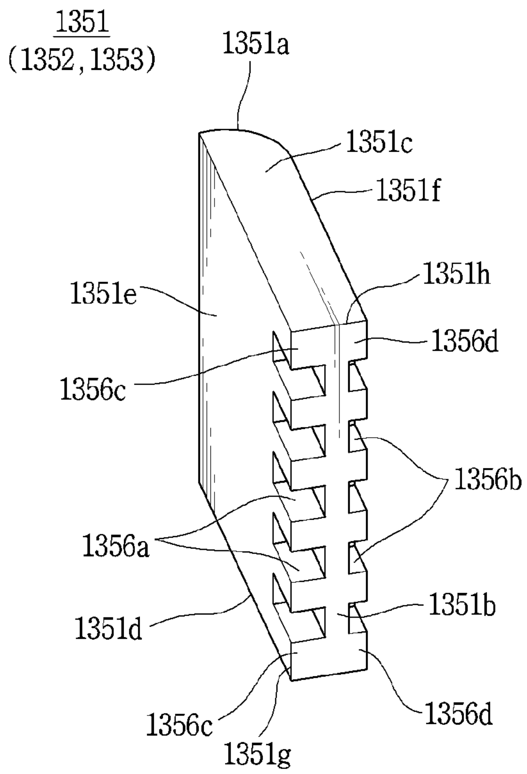
FIG. 16 is a perspective view of the oil supply groove in FIG. 11 according to still another embodiment.

FIG. 16 is a perspective view of the oil supply groove in FIG. 11 according to yet still another embodiment. Referring to FIG. 16, in the first vane 1351 according to this embodiment, the compression surface oil supply groove 1356*a* may be disposed at the second edge 1351*h* between the vane compression surface 1351*e* and the vane rear end surface 1351*b*, and the compression rear surface oil supply groove 1356*b* may be disposed at the second edge 1351*h* between the vane compression rear surface 1351*f* and the vane rear end surface 1351*b*.

A basic configuration and operational effects of the compression surface oil supply groove 1356*a* and the compression rear surface oil supply groove 1356*b* are similar to those of the above-described embodiments. In other words, the compression surface oil supply groove 1356*a* and the compression rear surface oil supply groove 1356*b* may each be disposed in a stepwise or inclined manner. In the present embodiment, an example in a stepwise manner will be mainly described.

Each of the compression surface oil supply grooves 1356*a* and the compression rear surface oil supply groove 1356*b* according to this embodiment may be disposed as a plurality. For example, the compression surface oil supply grooves 1356*a* may include a plurality of compression surface oil supply grooves 1356*a* disposed at preset or predetermined intervals along an axial direction.

As described above, even when the plurality of compression surface oil supply grooves 1356*a* is disposed, a predetermined amount of oil may flow into the compression surface oil supply grooves 1356*a*, thereby effectively lubricating between the first vane 1351 and the first vane slot 1342*a*, more particularly, between the second edge 1351*h* and an inner surface of the first vane slot 1342*a* facing the second edge 1351*h*.

In particular, when the plurality of compression surface oil supply grooves 1356*a* is formed, oil may be divided to be retained for each of the plurality of compression surface oil supply grooves 1356*a*, and with this structure, oil in an upper half thereof may be concentrated in a lower half thereof by its own weight while suppressing the oil from escaping from the compression surface oil supply groove 1356*a*, thereby uniformly lubricating between the vane 1351 and the roller 134 along an axial direction. Moreover, a frictional area between the first vane 1351 and the first vane slot 1342*a* may be reduced by an area of the compression surface oil supply groove 1356*a*, thereby suppressing friction loss and wear between the vane 1351 and the roller 134.

The plurality of compression surface oil supply grooves 1356*a* may have the same dimensions or different dimensions along an axial direction. For example, when the plurality of compression surface oil supply grooves 1356*a* have the same dimensions along an axial direction, the vane 1351 may be easily machined. On the contrary, when the plurality of compression surface oil supply grooves 1356*a* have different dimensions, a width or depth of the compression surface oil supply groove 1356*a* located in an upper half thereof may be larger than that of the compression surface oil supply groove 1356*a* located at a lower half thereof. Accordingly, even when oil flows down due to its own weight, a predetermined amount of oil may be secured in the compression surface oil supply groove 1356*a* located at an upper half thereof.

The compression rear surface oil supply groove 1356*b* may be symmetrical to the previously described compression surface oil supply groove 1356*a*. Accordingly, a basic configuration and operational effects of the compression rear surface oil supply groove 1356*b* are similar to those of the previously described compression surface oil supply groove 1356*a*, and thus, description thereof will be replaced with the description of the compression surface oil supply groove 1356*a*.

Although not shown in the drawings, even in this embodiment, the compression surface oil supply groove 1356*a* may have a larger width and depth than those of the compression rear surface oil supply groove 1356*b*. Even in this case, even when the vane front end surface 1351*a* of the vane is inserted into the roller to be inclined in the rotational direction of the roller 134, it may be possible to secure a sealing distance in the compression rear surface oil supply groove 1356*b*. In addition, even when an inner end of the vane 1351 is pressed in the rotational direction of the roller 134 by a pressure difference between the compression chambers located on both sides of the vane 1351, the second edge 1351*h* may be suppressed from strongly coming into close contact with an inner surface of the vane slot 1342*a* facing the second edge 1351*h* so as to reduce friction loss or wear.

Still yet another embodiment of the oil supply groove will be described as follows. That is, in the above-described embodiments, oil supply grooves may be disposed on upper and lower surfaces of the vane, or on a compression surface and a compression rear surface, but in some cases, oil supply grooves may also be disposed on the upper and lower surfaces of the vane, and on the compression surface and the compression rear surface, respectively.

Figure 17:
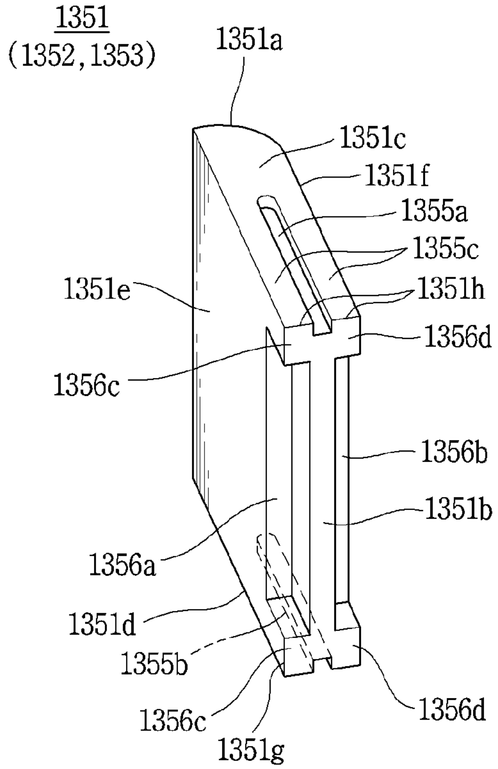
FIG. 17 is a perspective view of the vane in FIG. 1 according to still another embodiment.

FIG. 17 is a perspective view of the vane in FIG. 1 according to still another embodiment. Referring to FIG. 17, in the first vane 1351 according to this embodiment, an upper side oil supply groove 1355*a* and a lower side oil supply groove 1355*b* constituting an axial oil supply groove may be disposed on a vane upper side surface 1351*c* and a vane lower side surface 1351*d*, and a compression surface oil supply groove 1356*a* and a compression rear surface oil supply groove 1356*b* constituting a circumferential oil supply groove on a vane compression surface 1351*c* and the vane compression rear surface 1351*d*, respectively.

This is a combination of the embodiment of FIG. 4 and the embodiment of FIG. 11 described above, and the upper side oil supply groove 1355*a* and the lower side oil supply grooves 1355*b*, and the compression surface oil supply grooves 1356*a* and the compression rear surface oil supply grooves 1356*b* will be replaced with the description of each embodiment above. Of course, even in this case, only a portion of the axial oil supply groove and a portion of the circumferential oil supply groove may be respectively disposed.

As described above, when the axial oil supply groove is disposed on the vane upper side surface 1351*c* and the vane lower surface 1351*d*, and the circumferential oil supply groove is disposed on the vane compression surface 1351*c* and the vane compression rear surface 1351*d*, it may be possible to suppress friction loss and wear on an axial friction surface, as well as suppress friction loss and wear on a circumferential friction surface.

In the above-described embodiments, an example in which a plurality of vanes is provided in a vane rotary compressor has been described, but the same may be applied even when only one vane is provided.

In addition, the vane rotary compressor according to this embodiment may be more effective when using high-pressure refrigerant, such as R32, R410a, and $CO_2$, for example. For example, when high-pressure refrigerant is used, a large pressure difference is generated between the compression chambers, thereby allowing the vane and bearing to come into closer contact with each other. As a result, friction loss and wear between the vane and the bearing may be increased. However, when oil supply grooves are disposed on axial side surfaces of the vane as in this embodiment, friction loss and wear between the vane and the main bearing and the sub bearing facing the vane may be reduced.

The same may be applied between the vane and the roller. That is, when high-pressure refrigerant is applied thereto, a gas reaction force acting on the vane in a circumferential direction may be further increased while increasing a pressure of the compression chamber. As a result, an inner edge of the vane may further come into contact with the vane slot, thereby causing friction loss and wear. In this case, when oil supply grooves are disposed on respective circumferential side surfaces as described above, friction loss and wear between a vane and a vane slot may be reduced.

The oil supply groove in the above-described embodiments may also be similarly applied to other types of rotary compressors.

Figure 18:
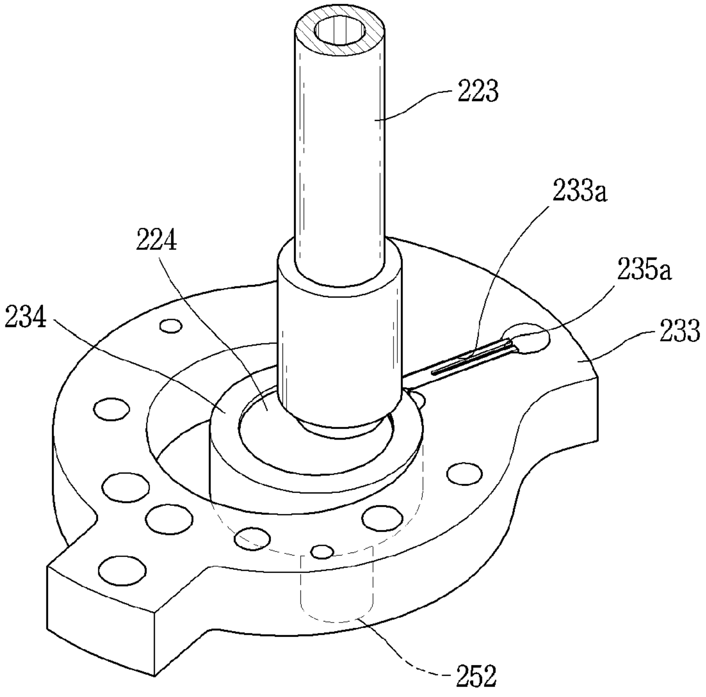
FIGS. 18 and 19 are exploded perspective views of compression units of other rotary compressors provided with a vane according to embodiments.
Figure 19:
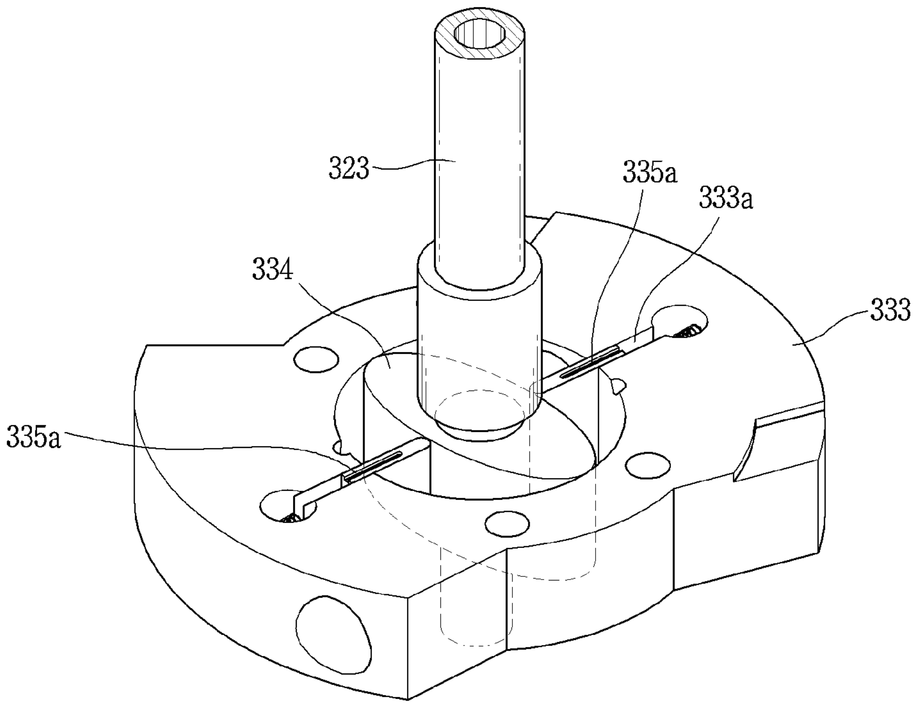

FIGS. 18 and 19 are exploded perspective views of compression units of other rotary compressors provided with a vane according to embodiments. Referring to FIG. 18, even in an eccentric rotary compressor in which a roller 234 is eccentric with respect to a cylinder 233, an axial oil supply groove 235*a* and/or a circumferential oil supply groove (not shown) may be disposed in the vane 235.

For example, in the eccentric rotary compressor according to an embodiment, an eccentric portion 224 may be provided on rotary shaft 223, and roller 234 may be rotatably inserted into the eccentric portion 224. Vane slot 233*a* may be disposed in the cylinder 233, and vane 235 may be slidably inserted into the vane slot 233*a*.

The vane 235 may be slidably in contact with or rotatably coupled to or integrally configured with an outer circumferential surface of the roller 234 to divide a compression space into a plurality of compression chambers. In this embodiment, there is illustrated an example in which the vane 235 is slidably in contact with the outer circumferential surface of the roller 234.

An axial oil supply groove 235*a* may be disposed on an axial side surface of the vane 235, and a circumferential oil supply groove (not shown) on a circumferential side surface of the vane 235. A basic configuration and operational effects of the axial oil supply groove 235*a* and the circumferential oil supply groove (not shown) are the same as those of the previously described embodiments, and detailed description thereof will be replaced with the description of the foregoing embodiments.

Referring to FIG. 19, even in a concentric rotary compressor according to an embodiment, an axial oil supply groove 335*a* and/or a circumferential oil supply groove (not shown) may be disposed in the vane 335. For example, in the concentric rotary compressor according to this embodiment, roller 334 may be provided on rotary shaft 323, and the roller 334 may be defined in an elliptical shape such that both ends thereof constitute a major axis are in contact with an inner circumferential surface of cylinder 333, thereby partitioning a compression space into a plurality of compression chambers together with a plurality of vanes 335 provided in a vane slot 333*a*.

An axial oil supply groove 335*a* may be disposed on an axial side surface of the vane 335, and a circumferential oil supply groove (not shown) on a circumferential side surface of the vane 235. A basic configuration and operational effects of the axial oil supply groove 335*a* and the circumferential oil supply groove (not shown) are the same as those of the previously described embodiments, and detailed description thereof will be replaced with the description of the previous embodiments.

The invention claimed is:

1. A rotary compressor, comprising:

a casing;

a cylinder provided inside of the casing to form a compression space;

a main bearing and a sub bearing provided on axial sides of the cylinder, respectively, and provided with a main bearing hole and a sub bearing hole passing therethrough, respectively, in an axial direction;

a rotary shaft supported by passing through the main bearing hole and the sub bearing hole;

a roller provided on the rotary shaft to be eccentrically provided in the compression space; and at least one vane slidably inserted into at least one vane slot provided in the roller or the cylinder to divide the compression space into a plurality of compression chambers, wherein the at least one vane is provided with at least one oil supply groove disposed on at least one of axial side surfaces facing at least one of the main bearing or the sub bearing, respectively, wherein the at least one oil supply groove is configured to have a larger length in a lengthwise direction than in a widthwise direction of the at least one vane, wherein the at least one oil supply groove comprises a first oil supply groove on a disposed side of a vane rear end surface accommodated in the at least one vane slot, and a second oil supply groove that extends from the first oil supply groove toward a vane front end surface on a side opposite to the vane rear end surface, and wherein a volume of the first oil supply groove is larger than a volume of the second oil supply groove.

2. The rotary compressor of claim 1, wherein sealing portions are disposed on both widthwise sides of the at least one oil supply groove, respectively, and wherein both of the sealing portions are larger than or equal to a width of the at least one oil supply groove.

3. The rotary compressor of claim 1, wherein the at least one oil supply groove comprises oil supply grooves disposed on both axial side surfaces of the at least one vane, respectively, and wherein the oil supply grooves disposed on the both axial side surfaces are symmetrical to each other.

4. The rotary compressor of claim 1, wherein the at least one oil supply groove comprises oil supply grooves disposed on both axial side surfaces of the at least one vane, respectively, and wherein the oil supply grooves disposed on both the axial side surfaces are asymmetrical to each other.

5. The rotary compressor of claim 1, wherein a discharge port is disposed on at least one side of the main bearing or the sub bearing, and wherein a length of the at least one oil supply groove facing the main bearing or the sub bearing on the side where the discharge hole is not disposed is configured to have a larger length than the oil supply hole on the side where the discharge hole is disposed.

6. The rotary compressor of claim 1, wherein the first oil supply groove extends from an edge of the vane rear end surface to communicate with the vane rear end surface.

7. The rotary compressor of claim 1, wherein the first oil supply groove is spaced apart by a predetermined distance from an edge of the vane rear end surface so as to be separated from the vane rear end surface.

8. The rotary compressor of claim 1, wherein another at least one oil supply groove is disposed on at least one of side surfaces of the at least one vane to extend from an edge of the vane rear end surface so as to communicate with the vane rear end surface accommodated in the at least one vane slot.

9. The rotary compressor of claim 8, wherein support portions are provided on both axial sides of the another at least one_oil supply groove, respectively, to be in contact with an inner surface of the at least one vane slot, and wherein the support portions extend from the vane rear end surface so as to protrude beyond the at least one oil supply groove.

10. The rotary compressor of claim 8, wherein the another at least one oil supply groove comprises a plurality of oil grooves disposed at predetermined intervals along an axial direction at the edge of the vane rear end surface.

11. The rotary compressor of claim 8, wherein the another at least one oil supply groove comprises a first oil supply groove disposed on a rotational side of the roller and a second oil supply groove disposed on a side opposite thereto, and wherein the first oil supply groove is deeper than the second oil supply groove in a widthwise direction of the at least one vane.

12. The rotary compressor of claim 8, wherein a vane front end surface of the at least one vane is inclined more than the vane rear end surface of the at least one vane, accommodated in the at least one vane slot, wherein the another at least one oil supply groove comprises oil supply grooves disposed on first and second circumferential side surfaces of the at least one vane, respectively, and wherein a first oil supply groove of the oil supply grooves on the first circumferential side surface of the at least one vane has a larger length than a second oil supply groove of the oil supply grooves on the second circumferential side surface.

13. The rotary compressor of claim 1, wherein at least one vane slot comprises vane slots disposed along an outer circumferential surface of the roller, wherein one or more back pressure chamber that communicates with the vane slots, respectively, is disposed to pass through in an axial direction inside of the roller, wherein a back pressure pocket that communicates with the one or more back pressure chamber is disposed on at least one side of the main bearing or the sub bearing, and wherein at least a portion of the at least one oil supply groove overlaps the back pressure pocket in the axial direction.

14. A rotary compressor, comprising:

a casing;

a cylinder provided inside of the casing to form a compression space;

a main bearing and a sub bearing provided on axial sides of the cylinder, respectively, and provided with a main bearing hole and a sub bearing hole passing therethrough, respectively, in an axial direction;

a rotary shaft supported by passing through the main bearing hole and the sub bearing hole;

a roller provided on the rotary shaft to be eccentrically provided in the compression space; and at least one vane slidably inserted into at least one vane slot provided in the roller or the cylinder to divide the compression space into a plurality of compression chambers, wherein the at least one vane is provided with at least one oil supply groove on at least one of side surfaces of the vane, wherein the at least one oil supply groove extends from an edge of a vane rear end surface to communicate with the vane rear end surface accommodated in the at least one vane slot, wherein support portions are provided on both axial sides of the at least one oil supply groove, respectively, to be in contact with an inner surface of the at least one vane slot, wherein the support portions extend from the vane rear end surface so as to protrude beyond the at least one oil supply groove, wherein the at least one oil supply groove comprises a first oil supply groove disposed on a rotational side of the roller and a second oil supply groove disposed on a side opposite thereto, and wherein the first oil supply groove is deeper than the second oil supply groove in a widthwise direction of the at least one vane, or wherein a vane front end surface of the at least one vane is inclined more than the vane rear end surface of the at least one vane, accommodated in the at least one vane slot, wherein the at least one oil supply groove comprises oil supply grooves disposed on first and second side surfaces of the at least one vane, respectively, and wherein a first oil supply groove of the oil supply grooves on the first side surface of the at least one vane has a larger length than a second oil supply groove of the oil supply grooves on the second side surface.

15. The rotary compressor of claim 14, wherein the first and second oil supply grooves comprise a plurality of first and second oil supply grooves at predetermined intervals along an axial direction at the edge of the vane rear end surface.

16. A rotary compressor, comprising:

a casing;

a cylinder provided inside of the casing to form a compression space;

a main bearing and a sub bearing provided on axial sides of the cylinder, respectively, and provided with a main bearing hole and a sub bearing hole passing therethrough, respectively, in an axial direction;

a rotary shaft supported by passing through the main bearing hole and the sub bearing hole;

a roller provided on the rotary shaft to be eccentrically provided in the compression space; and at least one vane slidably inserted into at least one vane slot provided in the roller or the cylinder to divide the compression space into a plurality of compression chambers, wherein the at least one vane is provided with at least one oil supply groove disposed on at least one of axial side surfaces facing at least one of the main bearing or the sub bearing, respectively, wherein the at least one oil supply groove is configured to have a larger length in a lengthwise direction than in a widthwise direction of the at least one vane, wherein a discharge port is disposed on at least one side of the main bearing or the sub bearing, and wherein a length of the at least one oil supply groove facing the main bearing or the sub bearing on the side where the discharge hole is not disposed is configured to have a larger length than the oil supply groove on the side where the discharge hole is disposed.

* * * * *